United States Patent
Montillo et al.

(10) Patent No.: US 6,526,165 B1
(45) Date of Patent: Feb. 25, 2003

(54) METHODS AND APPARATUSES FOR REFINING A GEOMETRIC DESCRIPTION OF AN OBJECT HAVING A PLURALITY OF EXTENSIONS

(75) Inventors: Albert A. Montillo, New Haven, CT (US); Ivan A. Bachelder, Newton, MA (US); Cyril C. Marrion, Jr., Acton, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/203,182

(22) Filed: Nov. 30, 1998

(51) Int. Cl.⁷ .................................................. G06K 9/00
(52) U.S. Cl. ...................... 382/145; 382/146; 382/151; 250/559.34; 348/126
(58) Field of Search ................................ 382/146, 151, 382/168, 170, 173, 289, 149, 147, 199; 348/87, 583, 94, 95, 126; 395/137, 904; 250/559.34, 559.36, 559.37; 356/237.4

(56) References Cited

U.S. PATENT DOCUMENTS

| | | | |
|---|---|---|---|
| 4,686,637 A | * 8/1987 | Linker, Jr. et al. | 382/146 |
| 4,845,764 A | * 7/1989 | Ueda et al. | 382/199 |
| 4,980,971 A | 1/1991 | Bartschat et al. | |
| 5,012,524 A | * 4/1991 | LeBeau | 382/151 |
| 5,023,916 A | * 6/1991 | Breu | 382/150 |
| 5,113,565 A | 5/1992 | Cipolla et al. | |
| 5,164,994 A | * 11/1992 | Bushroe | 382/288 |
| 5,268,999 A | 12/1993 | Yokoyama | |
| 5,343,028 A | 8/1994 | Figarella et al. | |
| 5,371,690 A | 12/1994 | Engel et al. | |
| 5,495,537 A | 2/1996 | Bedrosian et al. | |
| 5,497,451 A | 3/1996 | Holmes | |
| 5,545,887 A | 8/1996 | Smith et al. | |
| 5,627,912 A | 5/1997 | Matsumoto | |
| 5,790,702 A | * 8/1998 | Yoshimura | 382/209 |
| 5,805,722 A | * 9/1998 | Cullen et al. | 382/146 |
| 6,141,040 A | * 10/2000 | Toh | 348/126 |

OTHER PUBLICATIONS

Cognex Corporation, "Chapter 4 Caliper Tool," *Cognex 3000/4000/5000 Programmable Vision Engines, Vision Tools*, 1996, pp. 207–231, Release 7.4 590–0136, Natick, MA, USA.

Cognex Corporation, "Chapter 5 Inspection," *Cognex 3000/4000/5000 Programmable Vision Engines, Vision Tools*, 1996, pp. 245–266, Release 7.4 590–0136, Natick, MA, USA.

Cognex Corporation, "Chapter 8 Large–Leaded Device Inspection," *Cognex 4000/5000 SMD Placement Guidance Package User's Manual*, 1996, pp. 311–324, Release 3.2 590–1039, Natick, MA, USA.

Medina–Mora, et al., "An Incremental Programming Environment," *IEEE Transactions on Software Engineering*, Sep. 1981, pp. 472–482, vol. SE–7, No. 5, USA.

Ullman, Shimon, "Aligning pictorial descriptions: An approach to object recognition, I: Approaches to Object Recognition," reprinted from *Cognition*, Aug. 1989, pp. 201–214, vol. 32, No. 3, Cambridge, MA, USA.

* cited by examiner

*Primary Examiner*—Bhavesh Mehta
*Assistant Examiner*—Sheela Chawan
(74) *Attorney, Agent, or Firm*—Russ Weinzimmer; Tracy Calabresi

(57) ABSTRACT

A method and apparatus are disclosed for refining a rough geometric description (GD) and a rough pose of an object having extensions. The invention locates anchor points within an image of the object and uses the anchor points to align in at least one dimension the rough GD. In one embodiment, the anchor points are the tips of the extensions of the object; the rough GD of the object is then aligned along the angular orientation indicated by the tips. Thereafter, other dimensions of the rough GD and the rough pose are measured, measuring the dimensions having less unknowns first. The rough GD and the rough pose are then updated to provide the refined GD and refined pose. For one measurement, an extent of a region is measured using the expected area of region to threshold the region and segment it from the remainder of the image before measuring the extent of the region. An application of refining a GD of a leaded object is disclosed.

38 Claims, 17 Drawing Sheets

METHODS AND APPARATUSES FOR REFINING A GEOMETRIC DESCRIPTION OF AN OBJECT HAVING A PLURALITY OF EXTENSIONS

FIELD OF THE INVENTION

This invention relates to machine vision, and particularly to refining a geometric description and pose of an object in a digital image.

BACKGROUND

Many machine vision systems use geometric descriptions (GD) as canonical models for inspecting or recognizing objects within images. A GD is a collection of data that specifies the basic geometry of the object, that is the location of object features and dimensions of object features relative to each other, where the features include the object body, the number of extensions, or the number of lead sets, for instance.

Often, such GD-based models must accurately reflect the physical dimensions of the objects so that the position of the objects can be determined in an image, and so that precise tolerance checking and defect detection can be performed. For example, the contacts on printed circuit boards (PCB) must be within tolerances in order to correctly mate with corresponding contacts in a slot of a connector, such as the connector 160 and the PCB 162, shown in FIG. 1C, not drawn to scale.

For example, a vision-based automatic surface mounter (SMD) machine typically employs a GD-based model of leaded objects to accurately inspect and place leaded objects on a printed circuit board (PCB) by properly registering the object with pads on a PCB, such that the centers of the feet of the object align with the centers of pads on the PCB within positional tolerances. Registration of a pair of objects shall be defined as orienting a first object with respect to a second object so as to make all alignment parameters of the first object substantially equal to the corresponding alignment parameters of the second object. For example, a first semiconductor fabrication mask is said to be registered with an overlaying second semiconductor fabrication mask when a pair of fiducial marks of the first mask is located at the same projective position as the corresponding fiducial marks on the second mask.

FIG. 1A illustrates a bottom view and a side view of a gullwing-leaded object 100, not drawn to scale, where a leaded object is an electronic component that has a object body 110 and leads 102. The leads 102 are metal contacts on the exterior surface of the object body 110 that are connected to an integrated circuit (not shown) within the object body 110. Each of the leads 102 have feet 111 which comprise the portion of each of the leads 124 that makes contact with the PCB in a solder joint. Leaded objects include surface-mount components and through-hole components, for example.

The process of creating accurate GD-based models of objects, either by manually measuring the dimensions of the object, or by extracting the dimensions from manufacturing specifications, can be very tedious, especially when the objects are complicated.

Not only is the creation of the GD difficult, the task must be repeated for each object in a product; this makes changeover to new products on an assembly line very slow. For example, in addition to the SMD and through-hole leaded objects there are many types of BGA components, chips and all sorts of complicated odd-form objects, such as coils and connectors. Further, new objects are continually being introduced. Therefore, a prior GD cannot be reused without modification.

An alternative approach useful for some applications is to create featural models rather than models based on GD. A featural model describes the two-dimensional spatial arrangement of features, such as edges or corners, that constitute the appearance of an object. Featural models, however, require a large amount of processing memory, and an operator looking at the object cannot easily verify the correctness of featural models.

SUMMARY

A method is disclosed for refining a rough GD of an object having a plurality of extensions. Inputs to the method are a rough GD and a rough pose of the object within a digital image. The method evaluates the digital image of the object and locates at least two "anchor points" related to the extensions in the image. The "anchor points" are used to align in at least one dimension the rough GD relative to the object in the image. The dimensions of the object are then measured. The rough GD and the rough pose are updated with the measured dimensions to create a refined GD and a refined pose of at least a portion of the object and the plurality of extensions.

In one embodiment, the "anchor points" include points on substantially all the extensions extending from one side of the object. It is recognized by the invention that multiple "anchor points" along at least one side of the object, i.e., more data points per parameter, allows more accurate alignment of the rough GD relative to the object in the image. Consequently, the method makes more accurate subsequent measurements.

The subsequent measurements use information derived from prior measurements, such as measuring length using the orientation of the aligned rough GD, (i.e., the measurements build upon each other). Preferably, the measurements having fewer unknowns are determined before more difficult measurements. For instance, the method measures lead length of a leaded object before determining foot length of a leaded object, which is a more difficult measurement, or the method measures one-dimensional parameters, such as length, before measuring two-dimensional parameters, such as area. The invention recognizes that to correctly measure parameters of an object it is most useful first to refine the angular direction of the object followed by refining other one-dimensional parameters, and finally by refining the more difficult parameters last.

In one embodiment, an area of a portion of an extension, e.g., a foot of a lead, is measured by binarizing the portion with a threshold determined from predetermined parameters, such as the expected area. The binarized image is evaluated to determine the area.

In one embodiment, the method is applied iteratively, such that the first refined GD and refined pose becomes the rough GD and rough pose, and the process is repeated.

Uses of averages and expected parameters are disclosed that make the method more robust and the resulting measurements and the refined GD and refined pose more reliable, such as validating the GD against predetermined conditions to obviate obviously incorrect parts of the GD.

One of the advantages of the invention is that only easily obtainable input, a rough GD and pose, is required from an operator, while the invention determines the difficult parameters. Another advantage is that the invention achieves the accuracy of a featural model, while using less memory than a featural model. A further advantage of the invention is that the refined GD is visually verifiable by an operator as opposed to a featural model. A still further advantage of the invention is that it can be used over a wide range of objects.

A preferred application of the methods and apparatuses is generating a refined GD and refined pose of leaded objects.

BRIEF DESCRIPTION OF THE DRAWINGS

The invention will be more fully understood from the following detailed description, in conjunction with the accompanying figures, wherein.

DETAILED DESCRIPTION OF THE DRAWINGS

Figure 1B:
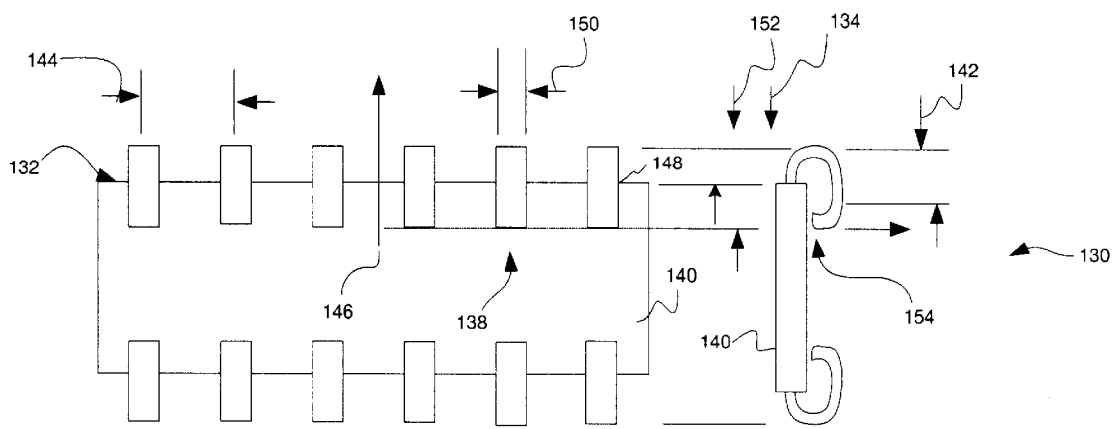
FIG. 1B is a bottom view and a side view of a j-leaded object, not drawn to scale, whose GD and pose can be refined using the invention.

The method refines a rough GD of an object having a plurality of extensions and a rough pose of the object within an image. The method is particularly useful in refining a rough GD of a leaded object. Though this is the form of a preferred embodiment, this embodiment should be considered illustrative, and not restrictive. The GD of a gullwing-leaded object 100 includes the lead length 104, the lead pitch 114, the lead width 120, and the foot length 112. In a gullwing-leaded object 100, the lead length 104 is measured from the terminating ends of the leads 102, i.e., the lead tips 106 and the lead bases 108. The lead pitch 114 is the distance between the lead centers 122. The lead width 120 is the distance between the sides of the leads 102. The foot length 112 is the length of each of the leads 124 that makes contact with the PCB in a solder joint.

In a j-leaded object 130, the GD includes the lead length 134, the lead pitch 144, the lead width 150, and the foot length 142. Except for lead length 134, the parameters are measured similarly to the gullwing-leaded device 100. For a front-lit j-leaded object, the lead length used by the SMD machine is typically the distance 134 between the lateral extremes 136 and 138 of the j-leads 132 as viewed in an image of the bottom of a j-leaded device 130, as shown in FIG. 1B. In a back-lit j-leaded object 130, the lead length 152 is the distance between the lateral extremes 136 and 148 of the j-leads as viewed in an image of the top of a j-leaded object. The lateral extremes 136 and 138 and the lead tips 106 and lead bases 108 are collectively referred to herein as lead tips and lead bases, respectively. Unlike the gullwing-leaded device 100, the terminating ends 148 and 154 of the j-leads are not visible within a front-lit image, and, therefore, are not appropriate end points for measuring lead length.

The GD of a leaded object can include other parameters or a subset of the preferred parameters, such as the number of lead sets, the number of leads, the type of leads (e.g., j or gullwing), whether the leads are equally spaced across each side of the object or whether a lead set has gaps (i.e., have missing leads), and whether the leads have varying lengths. The exact contents of the GD of an object will vary depending upon the object and the use of the object.

A pose describes the position of the object within an image and includes the rotational position of an object and the position of the origin of an object within an image. The pose is measured with respect to a coordinate system, such as the coordinate system of the image. In a preferred embodiment, the pose is measured with respect to a user-supplied client-coordinate system, and, as necessary, the method translates between the image-coordinate system and the client-coordinate system.

The pose of the leaded objects 100 and 130 is defined by the parameters theta, θ, 118 and 148 relative to the client-coordinate system, where θ as shown is 0°, and the x and y coordinates of the origins 116 and 146 of the objects 100 and 130, respectively. The origin of the object is chosen arbitrarily and can be any point, such as the point corresponding to the center of mass of an object, a point at the base of the leads at the body center, or at a point that is consistent with other machine-visions algorithms. The parameters that comprise the pose may also vary depending upon the object and the application. For instance, the specificity of the angular orientation may be relaxed for a symmetrical object.

Although a preferred embodiment of the method is refining a rough GD and rough pose of a leaded electronic object, the method of the invention can be used to refine the GD of other objects, such as chips, PLCs, and odd-form objects, including heat shields, connectors (such as the connector illustrated in FIG. 1C) and PCI connectors, for example. Any rough GD of an object having a set of extensions is amenable to being refined using the method of the invention. The method is not limited to electronic objects and can refine GD of other objects.

Figure 2:
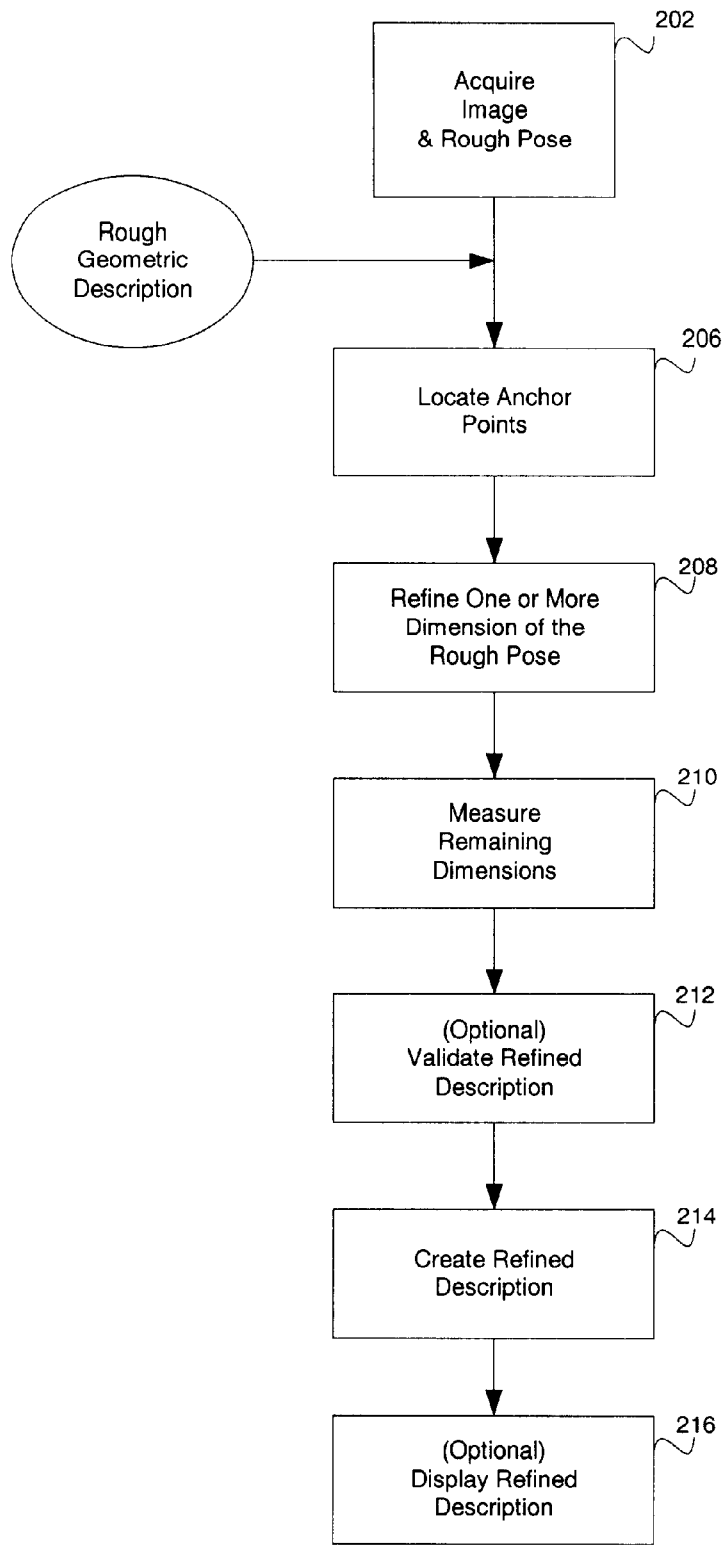
FIG. 2 is a flow chart of one embodiment of the invention.
Figure 3A:
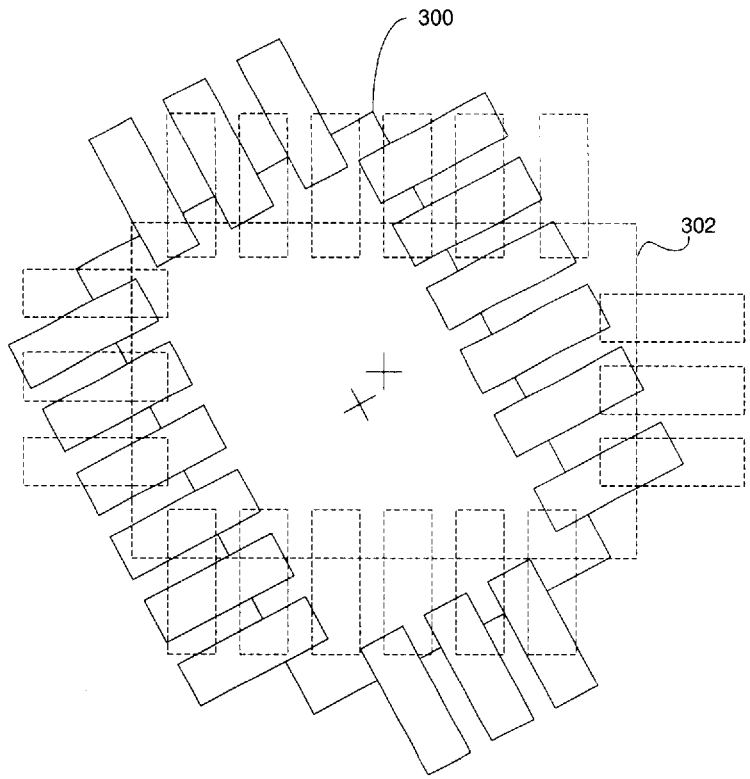
FIG. 3A is a representation of a rough GD and pose of an object having extensions superimposed over a bottom-view of an instance of the object in an image, not drawn to scale.

FIG. 3A illustrates a rough GD 302 superimposed over an image of an object 300, not drawn to scale. The rough GD 302 has an incorrect pose and has an incorrect foot length, lead length, lead width, and lead pitch. The method refines the rough GD of an object using the image of the object; one embodiment of the method of the invention is illustrated in the flow chart of FIG. 2, where the steps of the method will be denoted in the detailed description in parenthesis. An input of the method is a rough GD of the object in the image. The rough GD can be provided in many ways, such as read from data sheets, read electronically from a drawing, manually measured, or measured using overlay graphics on an image of the object.

The first step is to acquire an image of the object and obtain the rough pose of the object in the image (202). The object is imaged against a separate background, such as a white background, or the object can be mounted, such as on a PCB. Owing to the robust nature of the method, the background does not appreciably affect the accuracy of the refined GD of the object, as will become evident from the following description. The rough pose can be provided in many ways, such as read from data sheets, read electronically from a drawing, manually measured, or measured using scroll graphics on an image of the object.

The next step is to locate "anchor points" in the image (206). The "anchor points" are used to align at least one dimension of the rough pose of the object in the image before measuring the dimensions that constitute the refined GD and, preferably, the refined pose (208).

As used herein, anchor points are points in the image related to the extensions that are readily and reliably found in an image. The choice of anchor points is dictated by the object and the method of imaging the object.

In addition to being related to the extensions and being readily and reliably found, preferably, anchor points of leaded objects are the centers of the feet because the leaded objects are positioned by substantially aligning the centers of the feet with the centers of pads on a PCB. Ideally centers of the feet also correspond to the centroids of the feet. However, the centers of the feet are not readily and reliably found for all leaded objects because of the type of lead and/or the lighting system used to image the leaded object.

Figure 4A:
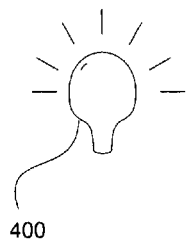
FIG. 4A is a schematic side view of a front-lit j-leaded object.
Figure 4A:
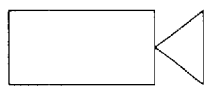
Figure 4A:
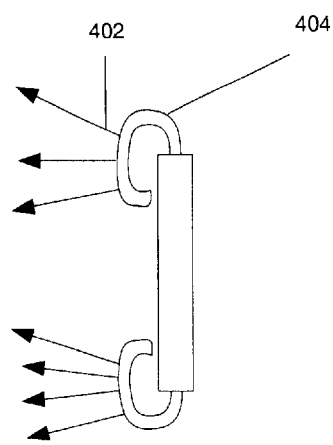
Figure 4B:
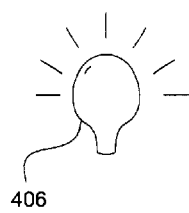
FIG. 4B is a schematic side view of a front-lit gullwing-leaded object.
Figure 4B:
Figure 4B:
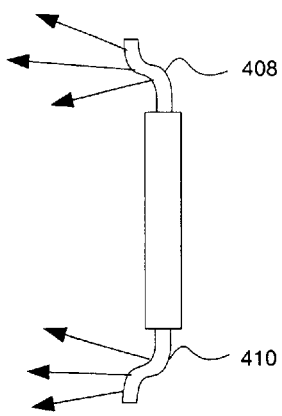
Figure 4C:
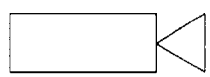
FIG. 4C is a schematic side view of a back-lit gullwing-leaded object.
Figure 4C:
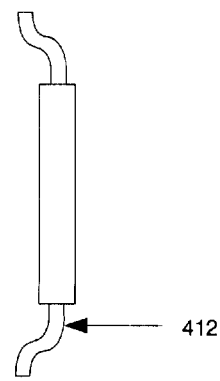
Figure 4C:
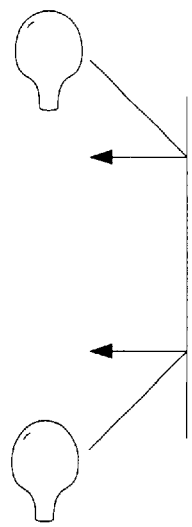

For both gullwing and j-leaded objects, an image generated by the back-lit imagery obstructs identification of the center or the feet because leads 412 appear as a silhouette; an example of a back-lit gullwing-leaded object is illustrated in FIG. 4C.

Figure 5:
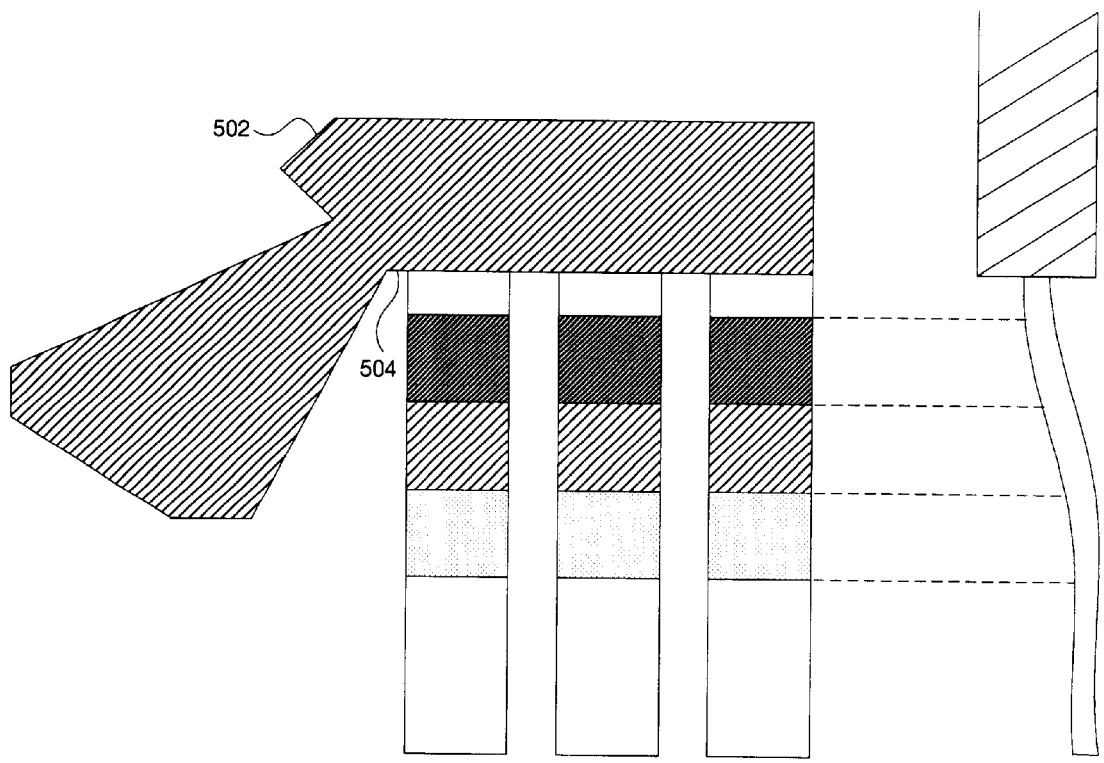
FIG. 5 is a representation of bottom view of an image and a side view of a portion of a gullwing-leaded object showing the varying intensities of the leads.

In a front-lit image of a gullwing-leaded object, the foot is not a silhouette, but it still is not readily identified. FIG. 5 illustrates a front-lit image of a portion of a gullwing-leaded object generated using the front-lit imagery of FIG. 4B, for example. The metal leads 408 specularly reflect the light 406 of the front-lit system. Further, the shape of the leads 408 causes reflections in some portions of the leads 408 to be stronger than other reflections. As known in the art, surfaces that are normal to the incident typically appear brighter to the imaging device.

When the centers of the feet are not readily and reliably found, anchor points are chosen near the centers of the foot, such as the lead tips which are related to the extensions and readily and reliably found.

Unlike the gullwing-leaded object 410, the centers of the feet of a j-leaded object can be readily identified from front-lit imagery, as illustrated in FIG. 4A. The center of the foot substantially corresponds to the position on the j-lead 404 that is normal 402 to the incident light 400, and thus is within the brightest area on the lead 404. The brightest area is reliably and readily found. Therefore, the anchor points of the j-leaded objects are the centers of the brightest areas on the feet.

Figure 3B:
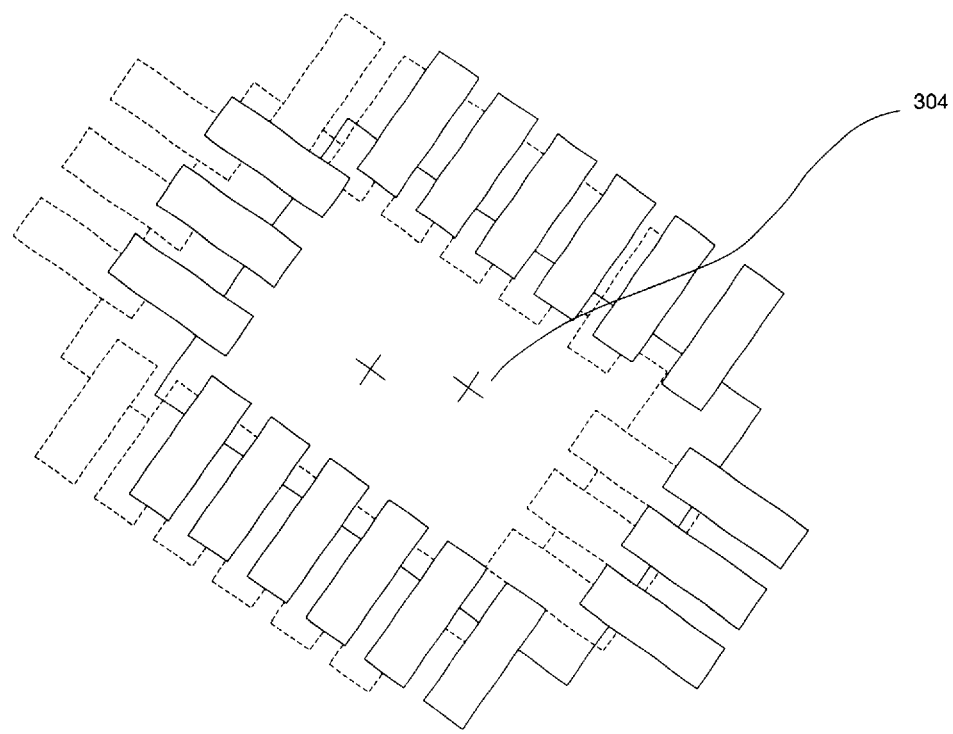
FIG. 3B is a representation of a partially realigned rough GD superimposed over a bottom-view of an instance of the object in an image, not drawn to scale.

The anchor points and their positions within the image are used to update at least one dimension of the rough pose (208), as described hereinafter. For the leaded object, the updated dimension of the rough pose is either θ or the origin. Using the updated dimension, the rough GD of the object is aligned relative to the object in the image. FIG. 3B is a representation of a realigned rough GD 304 of FIG. 3A along θ relative to the image of the object 300. Alternatively, if the anchor points refine the origin, the rough GD is translated to the refined origin position, and then θ is determined. If the origin is refined first, θ can be determined using known search techniques, such as comparing the image to templates of the rough GD of the object at multiple angles, and choosing as θ the θ of the template that most closely matches the image. Once θ is refined, the remaining dimensions are measured as described hereinafter.

Figure 6:
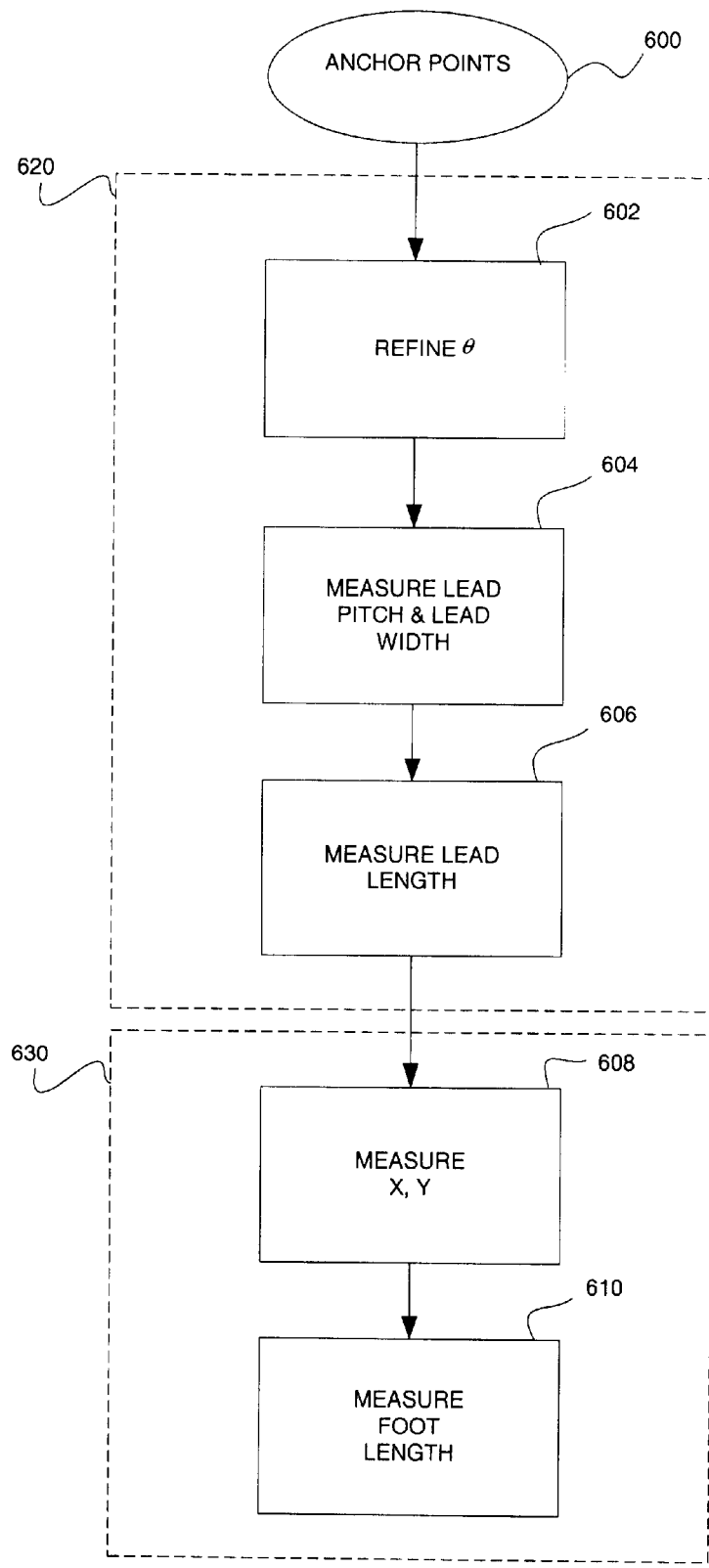
FIG. 6 is a flow chart illustrating one embodiment of the ordering of measurements in the method of FIG. 2.

It is recognized by the invention that it is most useful to refine the angular orientation of the rough GD before any other dimensions, particularly for a leaded object. The other dimensions are measured using the refined angular orientation. FIG. 6 illustrates a preferred ordering of the measurements where measurements having fewer unknowns are measured first (620), such as θ, length, or any one-dimensional measurement, while more difficult measurements (630), such as foot length, are measured later. Often measurements having more unknowns, such as two-dimensional measurements, are more difficult than measurements having fewer unknowns, particularly when the same procedures are used to locate and calculate both measurements. Preferably, the rough GD and rough pose of a leaded object is refined in the following order: θ (602), lead pitch and lead width (604), lead length (606), origin of the object (608), and then foot length (610).

FIGS. 7A–7D illustrate a preferred embodiment of how anchor points are located and θ is refined for a gullwing-leaded object using the CALIPER TOOL, where the CALIPER TOOL find edges corresponding with anchor points, a line is fitted to the anchor points, and the angular orientation of that line is θ. The CALIPER TOOL is a machine-vision tool further described in Vision Tools, Chapter 4, CALIPER TOOL, Cognex Corporation Revision 7.4, 1996, pp. 208–231, incorporated herein by reference, and illustrated in FIG. 8.

The CALIPER TOOL finds edges, such as 806 and 808, within an area of an image 800 enclosed by a window 804. More particularly, the CALIPER TOOL accumulates edges along a projection axis, pa, of the window 804. An edge, as used herein, consists of a plurality of connected edge elements or edge pixels that correspond to underlying image pixels. An image can be represented as an array of image pixels, where an image pixel is a picture element characterized by a grey value. Each edge can be one or more image pixels wide.

The intensities of pixels within the window 804 along pa are projected, i.e., added, thereby, generating a one-dimensional image 810. The projection axis, pa, is perpendicular to l, and together l, pa, and w, which is the width of the window 804, define the window 804. Linear projection collapses an image by summing the grey values of the pixels in the direction of the projection. The summation tends to accumulate edges in the same direction as pa. After projection, an edge filter is applied to the one-dimensional image 810 to further enhance edge information and to smooth the one-dimensional image 810. The one-dimensional image is illustrated graphically as histogram 812. The edge 806 is represented in the histogram 812 as a falling ramp 816, and the edge 808 is represented in the histogram as a rising ramp 818. Each edge 806 and 808 has a polarity (i.e., direction), where edge 806 has a light-to-dark polarity and edge 808 has a dark-to-light polarity. In this example, both edges 806 and 808 have the same contrast, where contrast is the difference in grey levels on opposite sides of an edge.

Although a preferred embodiment uses the CALIPER TOOL, any method that measures the position of higher contrast points of an image is sufficient, such as scanning an area of the image using a window at multiple positions. Scanning a line of an image in one direction and evaluating the resulting intensity signal will also work to a lesser extent.

Returning to FIG. 7A, the windows 702 are placed over the expected position of the leads 704, such that the length, l, of the windows 702 extend over the lead tips 706 and the lead bases 708.

Figure 9:
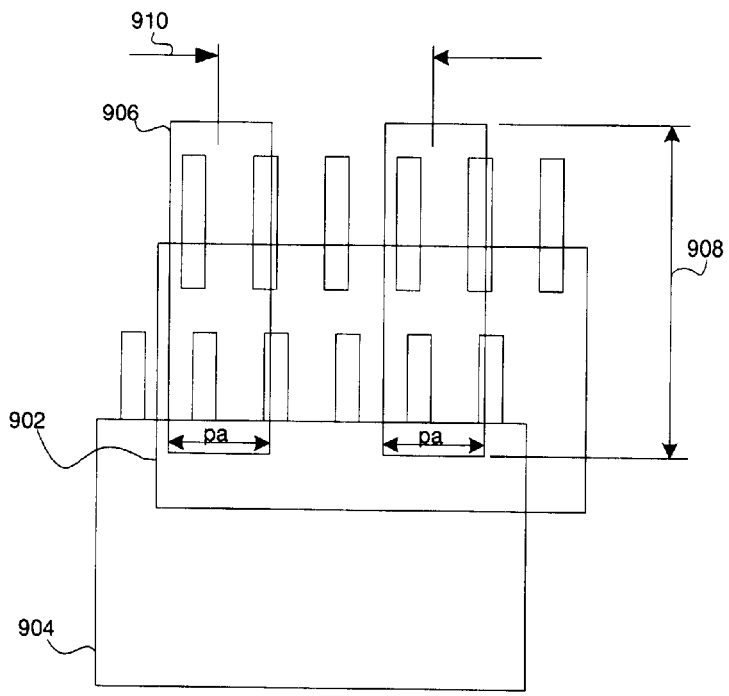
FIG. 9 is a representation of a leaded object at two positions within an area of uncertainty, where the area of uncertainty reflects the expected inaccuracy of a rough pose and rough GD, not drawn to scale. Also shown are several windows of the CALIPER TOOL positioned to find lengths of leads with their projection axes somewhat normal to the length of the leads.

The length of the window is based on the expected lead length and the uncertainty of the object position. The uncertainty of the object position is illustrated in FIG. 9, which shows two positions of an object 902 and 904 at the same rotation within the area of uncertainty, not drawn to scale. Because the window of FIG. 7A extends over a lead tip and a lead base, the necessary length 908 of the window 906 increases as the uncertainty of the object's vertical position increases.

Further, the distance between the two windows 702 also depends on the uncertainty of the object position.

Specifically, the distance 910 decreases as the uncertainty increases, so that each of the windows 906 can expect to search an area of the image having a lead.

The windows 702 have the same orientation as θ of the rough pose.

Using these constraints, one skilled in the art can properly position the windows 702, such that the windows search an area of the image containing a lead base and lead tip. Alternatively, more than two windows of the CALIPER TOOL can be used.

Figure 7A:
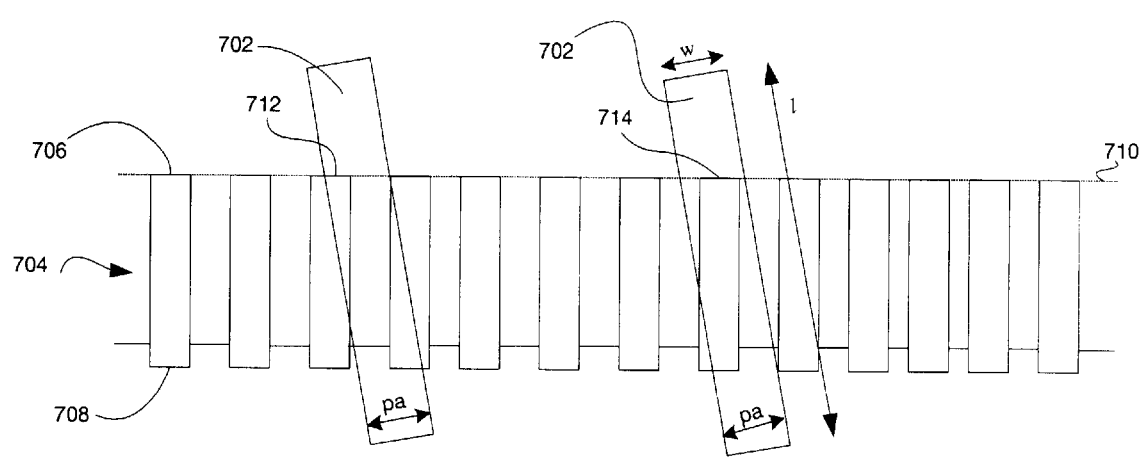
FIG. 7A is a set of leads in an image, not drawn to scale, and a representation of two large windows of the CALIPER TOOL positioned with their projection axes generally aligned with the rough pose.
Figure 7B:
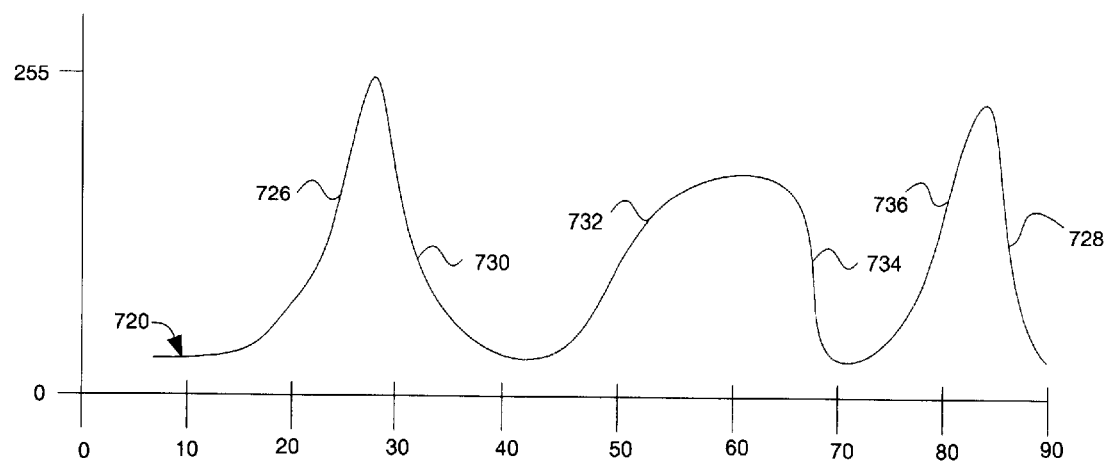
FIG. 7B is a representation of a spatial histogram generated by the left window of the CALIPER TOOL of FIG. 7A.
Figure 8:
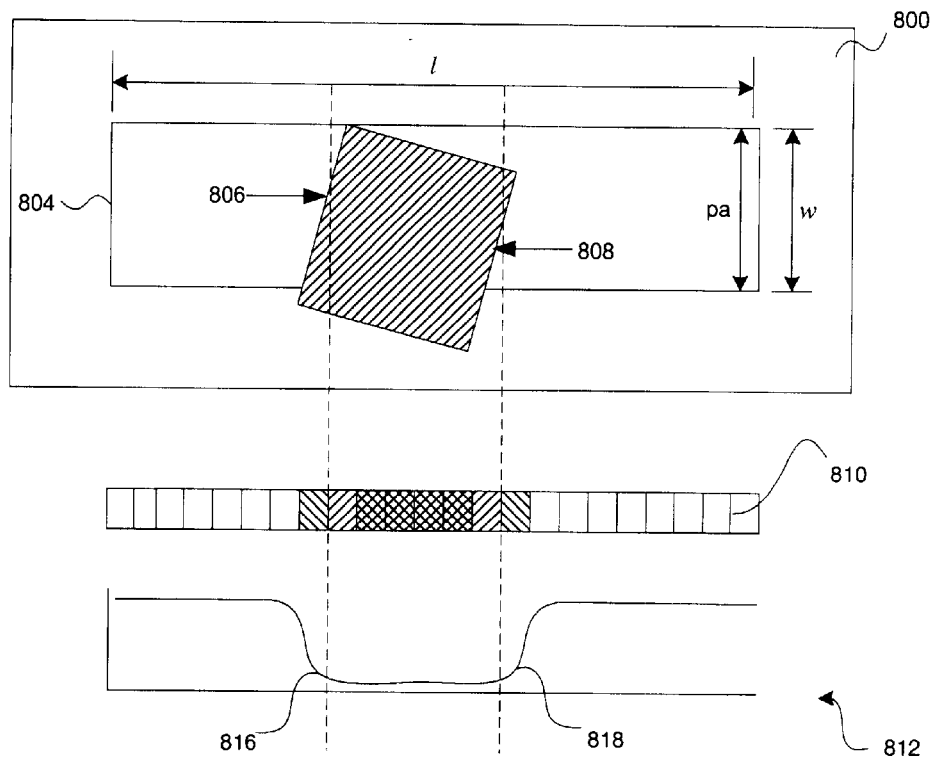
FIG. 8 is an object in an image, a representation of a window of the CALIPER TOOL extending across the object, a one-dimensional image generated from the projection of the pixels within the window, and a spatial grey-level histogram, which is a graphical representation of the one-dimensional image.

Once the windows 702 are positioned, the pixel grey values within the windows are summed along the projection axis, pa. The sum results in a one-dimensional intensity signal for each window 702, which is then filtered, as previously described. An example of a filtered signal resulting from the projection of the left windows is shown in FIG. 7B. The one-dimensional signal 720 contains two edges 726 and 728 that correspond to the lead tip 706 and the lead base 708, respectively, as well as several spurious edges 730, 732, 734, and 736.

Spurious edges are common for front-lit leaded objects. The extraneous edges correspond to features on the body of the object, such as 502, especially the outline of the body 504, shown in FIG. 5. Again, the shape of the leads causes reflections in some portions of the lead to be stronger than others as well as the edges caused by the specular reflection from metal leads.

In addition to filtering the edge information within the one-dimensional image, geometric constraints are applied to the edges to limit the number of edges in the one-dimensional image, and thereby minimize confusion between a tip and base of a lead and noise in an image. Geometric constraints are described in Vision Tools, Chapter 4, CALIPER TOOL, Cognex Corporation, Version 7.4, 1996, pp. 208–231, incorporated herein by reference. Geometric constraints assign a score to each edge or edge pair.

The score is used to distinguish the edges corresponding to the tip 706 and the base 708 of the lead from spurious edges 730, 732, 734, and 736. In the leaded object application, the scoring function considers the lead length of the rough GD, the expected lead positions given by the rough pose, and the expected polarity of a lead tip and lead base, i.e., a polarity change from dark-to-light followed by light-to-dark. The complexity of the scoring function depends upon each application, while emphasizing known or expected relationships of the tips and bases of the extensions.

If the expected lead length is 70, the scoring function chooses edge 726, a dark-to-light edge, and edge 728, a light-to-dark edge. The edge 728 approximately corresponds to a lead tip 712, i.e., anchor point of a gullwing-leaded object. The process is repeated for the second window. Similarly, the lead tip 714 is located. A line 710 is fit to the anchor points 712 and 714 with techniques known in the art, where the angle of the line 710 provides a more accurate angular orientation of the object than provided by the rough pose, designated $\theta_1$.

Figure 7E:
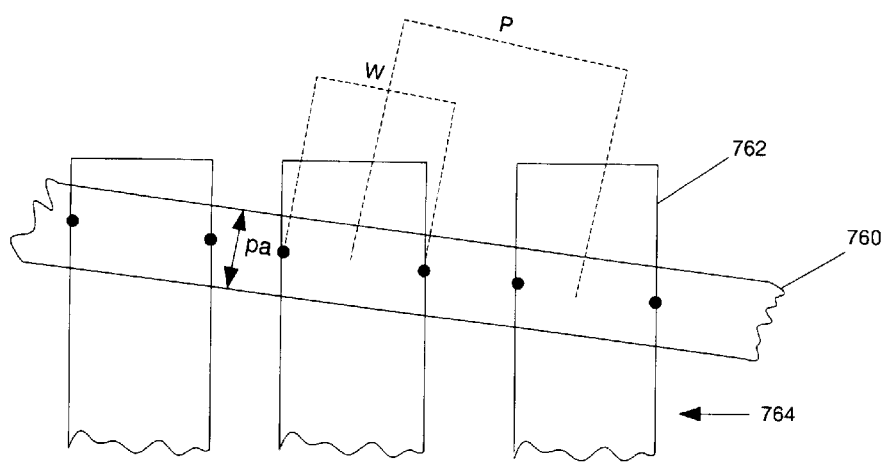
FIG. 7E is three leads of a leaded object having a window placed with its projection axis 90° offset from the projection axis of the windows in FIG. 7C, therefore, generally parallel to the length of the leads.
Figure 7C:
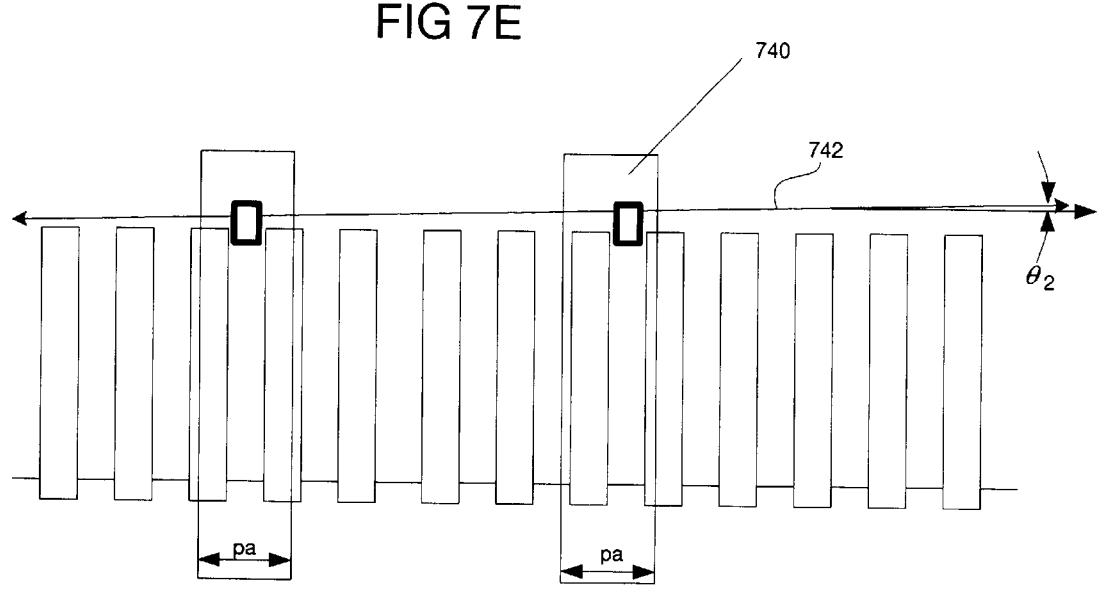
FIG. 7C is a representation of the two windows of FIG. 7A realigned over the image such that their projection axes are closer to normal to the length of the leads than the position of the windows of FIG. 7A.
Figure 7D:
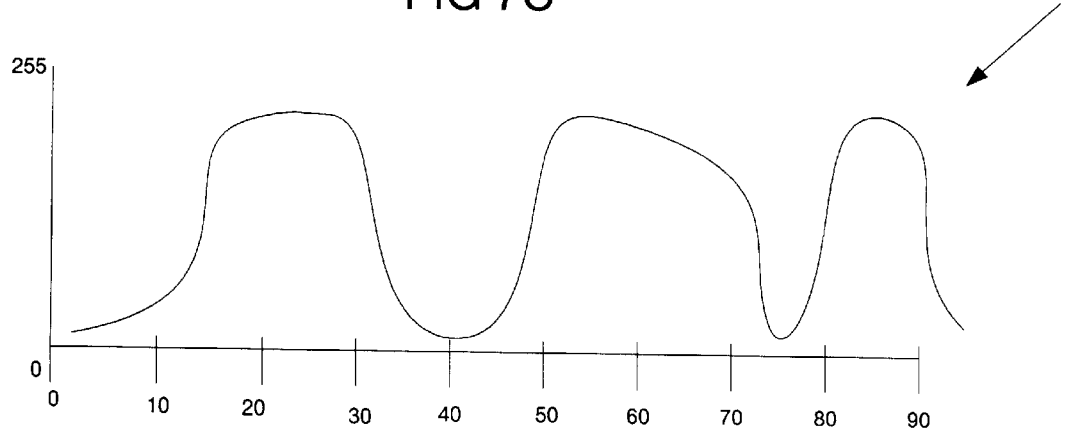
FIG. 7D is a representation of a spatial histogram generated by the left window of FIG. 7C.

Optionally, to improve the accuracy of the angular orientation, the projection axis of the two windows 702 is re-aligned substantially parallel to 91 such that the projection axis is coaxial with the lead tip, as shown in FIG. 7C. Projection along a direction of the lead tip, i.e., edge, produces sharper edges in the one-dimensional signal. Therefore, realigning the windows 740 reduces error in the lead tip and lead base locations inferred from the one-dimensional signal 750, as illustrated in FIG. 7D. A line 742 is fit to the revised anchor points designated by a "□" in FIG. 7C and the angle of the line 742 is $\theta_2$.

Alternatively to the methods illustrated in FIGS. 7A–7D, $\theta_1$ is determined by finding the center of the bright areas, e.g., anchor point of a j-leaded object. First, an intensity threshold is computed for a region surrounding the leads, such as the region within the windows 702. The threshold can be determined using the method described in commonly assigned, co-pending patent application, application Ser. No. 08/735,628 entitled "Model-based Adaptive Segmentation," incorporated herein by reference. The center of the bright area is found using methods known in the art, such as a connected component analysis or using the BLOB TOOL a software tool sold by Cognex corporation as more fully described in Vision Tools, Chapter 5, Inspection, Revision 7.4, 1996 pp. 245–266, incorporated herein by reference. The BLOB TOOL returns the center of the bright area, i.e. anchor point. The process is repeated for a second bright area, and the centers of the feet are fit to a line, thereby yielding a more accurate $\theta$.

Alternatively, a more accurate $\theta$ of a four-sided leaded object can be determined using the method of Matsumoto, U.S. Pat. No. : 5,627,912.

Although it is not preferred in one embodiment, any single one of the $\theta$s, collectively herein referred to as $\theta_2$, can update the rough pose, step (208). Thereafter, the remaining measurements are refined (210) using the updated position of the GD.

Figure 1A:
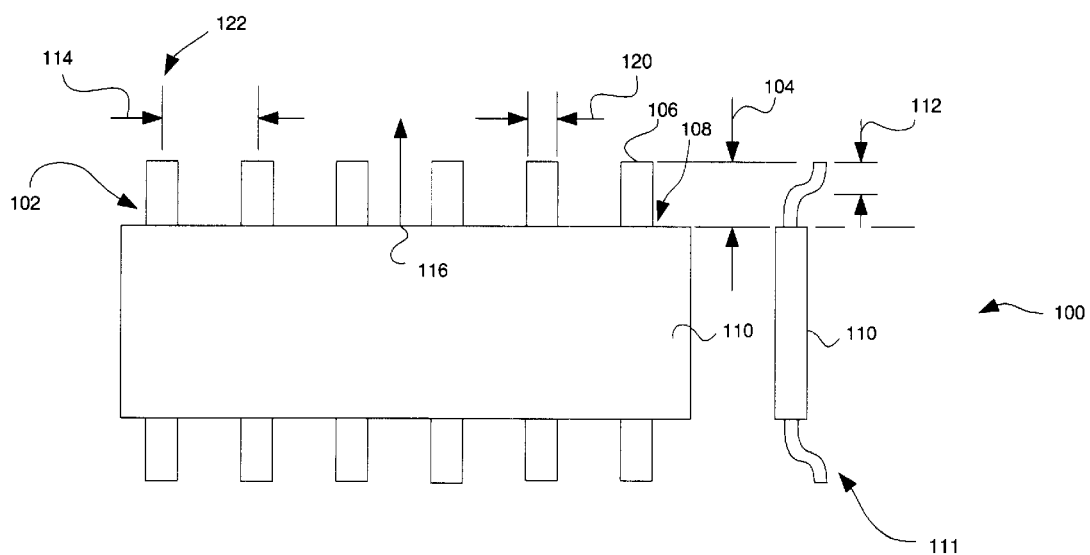
FIG. 1A is a bottom view and a side view of a gullwing-leaded object, not drawn to scale, whose GD and pose can be refined using the invention.
Figure 1C:
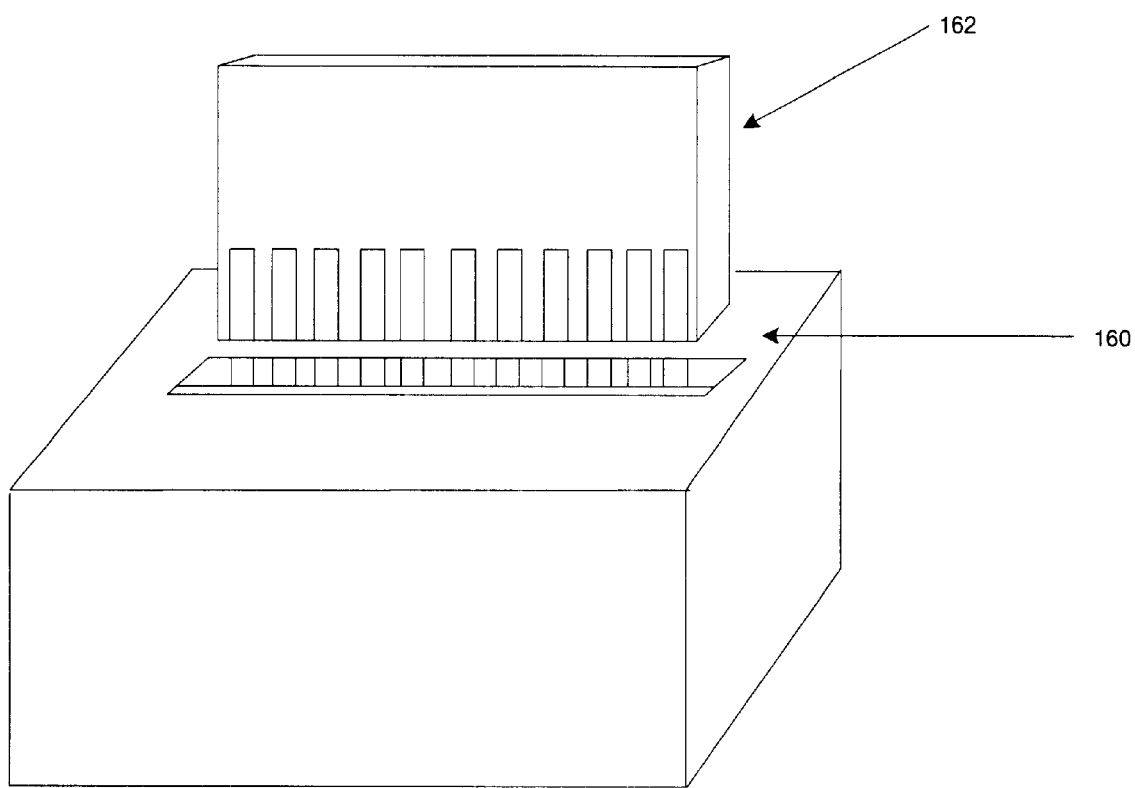
FIG. 1C is a perspective exploded view of a PCB and a connector, not drawn to scale. The PCB's and connector's GD can be refined using the method of the invention.

With reference to FIGS. 1A and 1B, the lead length is measured, as the difference in position between the lead tip 106 and lead base 108 for a gullwing-leaded object and the lateral extremes 136 and 138 for a j-leaded object, collectively referred to herein as lead tips and lead bases, respectively. The positions of the bases and the tips are determined from the histogram 750 or a similarly generated histogram for the j-leads.

Next, the lead pitch and lead width are measured as illustrated with reference to FIG. 7E, where FIG. 7E depicts three leads of a leaded object, not drawn to scale. A window 760 of the CALIPER TOOL is positioned having its projection axis 90° offset from $\theta_2$, i.e., "generally parallel" to the length of the leads. For example, pa of window 760 is 90° offset from the pa the windows in FIG. 7C. As used generally parallel or generally normal is the degree of accuracy achieved by $\theta_2$. As previously described, the pixels within the window 760 are projected along pa, filtered and scored to locate the edges corresponding to the sides 762 of the leads 764. The sides of the leads found by the window 760 are designated by a "•." The length of the window 760 is determined using the rough GD and the uncertainty of the object in the image at this point in the method.

Preferably, geometric constraints and scores are used to ensure that edges identified correspond to the sides of the leads 764. In this instance, the score considers that the lead sides of a single lead have an opposite polarity, the lead sides have high contrast edges, and the lead sides are approximately an expected lead width apart. The scoring favors pairs of edges.

Figure 10:
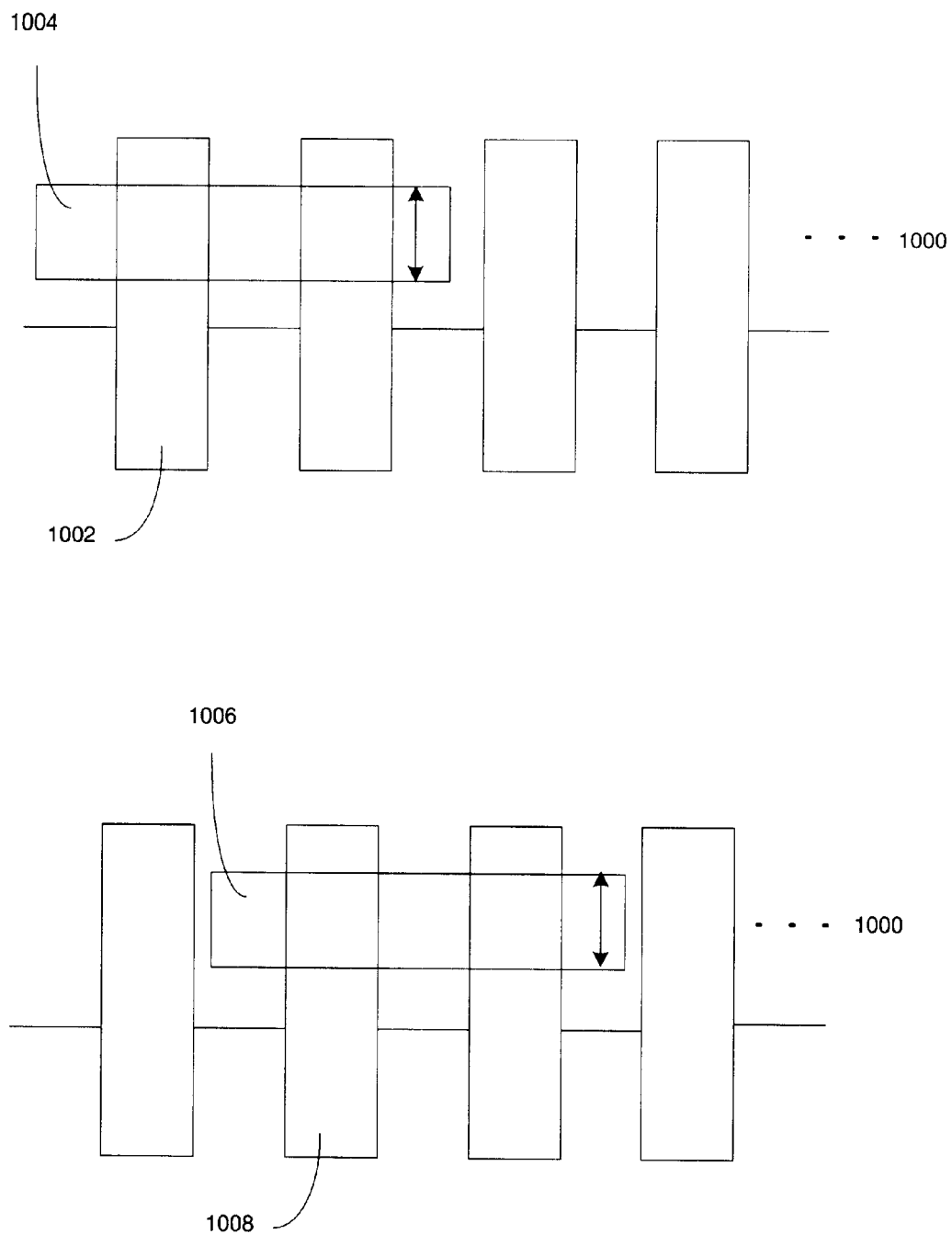
FIG. 10 is a representation of a series of windows laid across only a portion of the leads, not drawn to scale, in a searching pattern from the left-most lead to the right-most lead.

In a preferred embodiment, the method locates pairs of edges representing sides of a single lead, i.e., applies geometric constraint(s), before searching for edges of a subsequent lead. The search pattern minimizes confusion between a side of a lead and noise in an image. Part of the search pattern is illustrated in FIG. 10, not drawn to scale. First, the edge pair of the first lead 1002 is located within window 1004 before window 1006 searches for the edge pair corresponding to the second lead 1008. The image 1000 is searched from left to right until all edge pairs are located.

An edge pair of a lead contains two edges with opposite polarities; the opposite polarity is a geometric constraint. The geometric constraint can also include the lead pitch, the lead width, or contrast of the edges as needed. The complexity of the geometric constraint required depends upon each application.

From the positions of the sides, the lead width, w, of each lead and the lead pitch, p, between each pair of leads is determined. In a preferred embodiment, the median lead width, w, and lead pitch, p is computed to minimize the effect of outliers, such as a lead pitch measurement of a bent lead, for example.

The accuracy of the lead pitch and lead width is a function of the accuracy of the positions of the lead sides. The closer the window 760 is oriented normal to the length of the lead, the more precise are the generated lead side positions, i.e. the positions designated by a "•", where the window 760 is oriented using $\theta_2$. Accordingly, in a preferred embodiment, $\theta_2$ is refined further prior to updating any part of the rough GD or the rough pose.

$\theta_2$ is refined by finding more anchor points and performing a line fit to the least-squares line that fits the increased number of points, thus, providing increased precision. For example, in quad flat packs and plastic leaded chip carriers at least 8 leads are on each side of the object; each of the eight leads has an anchor point. It is recognized by the invention that using more anchor points per parameter produces a more accurate refined dimension of the pose, and thus more accurate subsequent measurements.

Figure 7F:
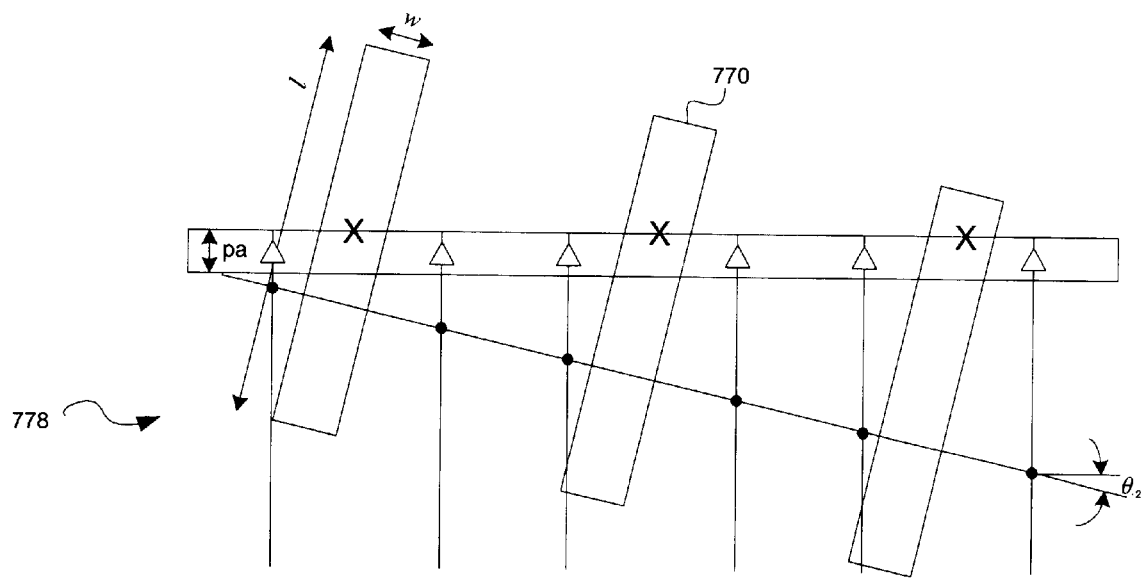
FIG. 7F is three leads of the image of FIG. 7E having a window placed along each of the leads with its projection axis generally normal to the length of the leads. Also shown is a realigned window placed across the tip of the leads with its projection axis substantially parallel to the length of the leads.

With reference to FIG. 6, FIG. 7F illustrates how the additional anchor points are located. An individual window 770 for each of the leads 778 is positioned with its projection axis substantially parallel to the line 772 corresponding to $\theta$. The width of each window 770 is centered at the midpoint of the line between the lead sides, designated "O". The angular orientation, $\theta_2$, of the line 772 is likely incorrect. However, windows 770 positioned using this line 772 cross most lead tips. The lead tip position, i.e. anchor point for a gullwing-leaded object, designated by "X" is found upon projection of the pixels within each window 770 as previously described. The edge corresponding to each X is chosen using a scoring function that favors strong edges farther away from the object body having the correct polarity.

For j-leaded objects, additional anchor points, i.e., the centers of the bright area of each lead foot, are located using a connected component analysis. Optimally, the connected components analysis is performed within a window positioned as window 770 using $\theta_2$. In addition to finding more anchor points, the lead tips of the j-leads designated by the X's can also be found as described above. After the additional anchor points are found, measurements for the j-leaded objects can be made using the anchor points or the lead tips, except for the lead length measurement that requires the lead tips.

A line 744 is fit to anchor points or lead tips, and the angle of that line is the refined theta $\theta_r$, (602). The line is determined using least-squares fit or other line finder algorithms known in the art.

Using $\theta_r$, the position of the lead sides are refined by positioning a window 776 across the tip of the leads with its projection axis 90° offset from $\theta_r$, such that pa is "substantially parallel" to the length of the leads. As used herein substantially parallel or substantially normal designates the accuracy calculated using $\theta_r$. As previously described, the lead sides are identified, designated α, preferably using the searching pattern described with reference to FIG. 10.

The lead width and lead pitch of the leads are measured using the lead side positions (604). Each value and the resulting median values are more accurate because the revised lead sides designated A are more accurate than lead sides designated •.

Next, the lead length measured in FIG. 7D is further refined. Preferably, the length is measured according to the algorithm described in the related co-pending U.S. application, Ser. No. 09/201,412 entitled, "Methods and Apparatuses for Measuring an Extent of a Group of Objets within an Image," which Application is filed concurrently herewith on Nov. 30, 1998 in the names of Albert Montillo, Ivan Bachelder, and Cy Marrion, and which Application is hereby expressly incorporated by reference in its entirety. However, other conventional length finding techniques could also be used to perform the length measurement, such as realigning the windows 740 of FIG. 7C at $\theta_r$ as opposed to $\theta_2$, generating a histogram, and finding the distance between the edges corresponding to the lead bases and lead tips.

Once length is measured (606), either the origin or the foot length is calculated; the order is inconsequential. The origin of the object is determined using the position of the side of the leads at extremes of the object (608). In a preferred embodiment, the origin is (½(number of leads)× (pitch),-length of the leads) and oriented at $\theta_r$, where the values are relative to an image-coordinate system having an origin in the upper-left corner.

The parameters of the foot are hard to determine for the reasons discussed above and illustrated in FIG. 5, where FIG. 5 represents a front-lit image of the intensities of a foot, such as specular reflections. The parameters of the foot cannot be determined from a back-lit image.

Figure 11:
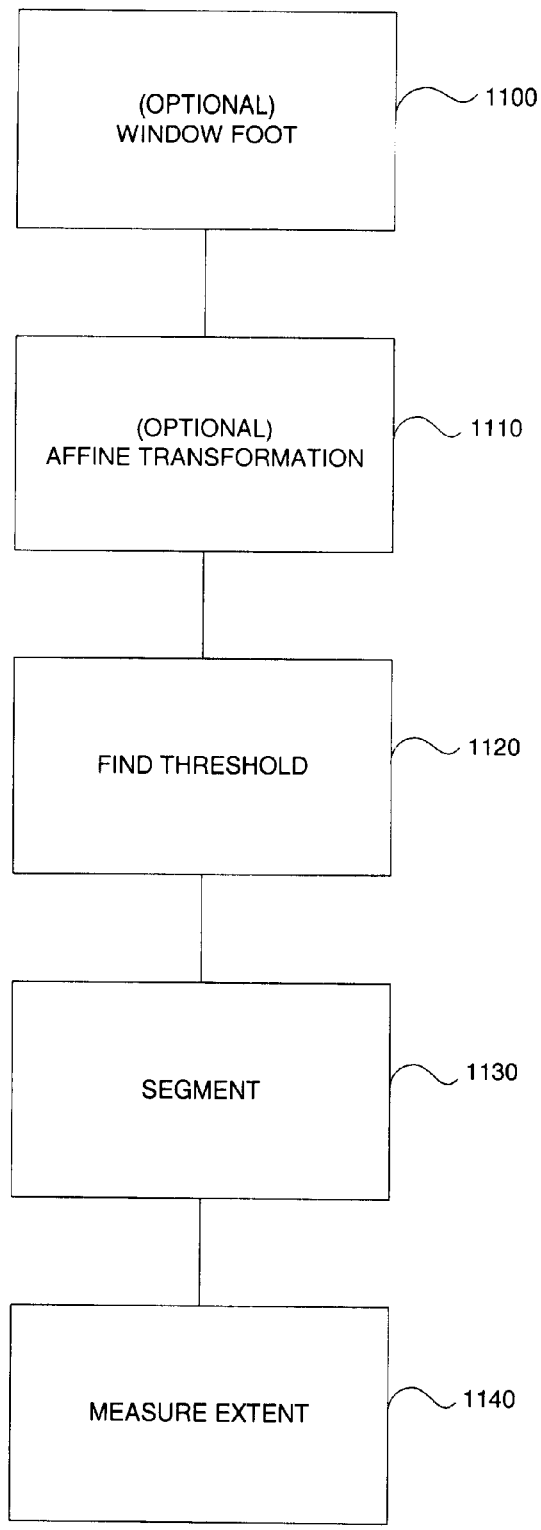
FIG. 11 is a flow chart of one embodiment to find the extents of a foot on an extension in the method of FIG. 2.

The parameters of the foot are determined by finding the area of the foot and then computing the center and foot length using the steps illustrated in FIG. 11, where the steps of the method are denoted in the detailed description in parenthesis. As hereinafter described, the area of the foot is measured by segmenting the image of the foot, wherein the foot is reassigned one grey value and the rest of the image is assigned another grey value (1130) using a previously determined threshold (1120). Then, the segmented image is measured for the extent of the foot (1140) as hereinafter described.

Figure 12A:
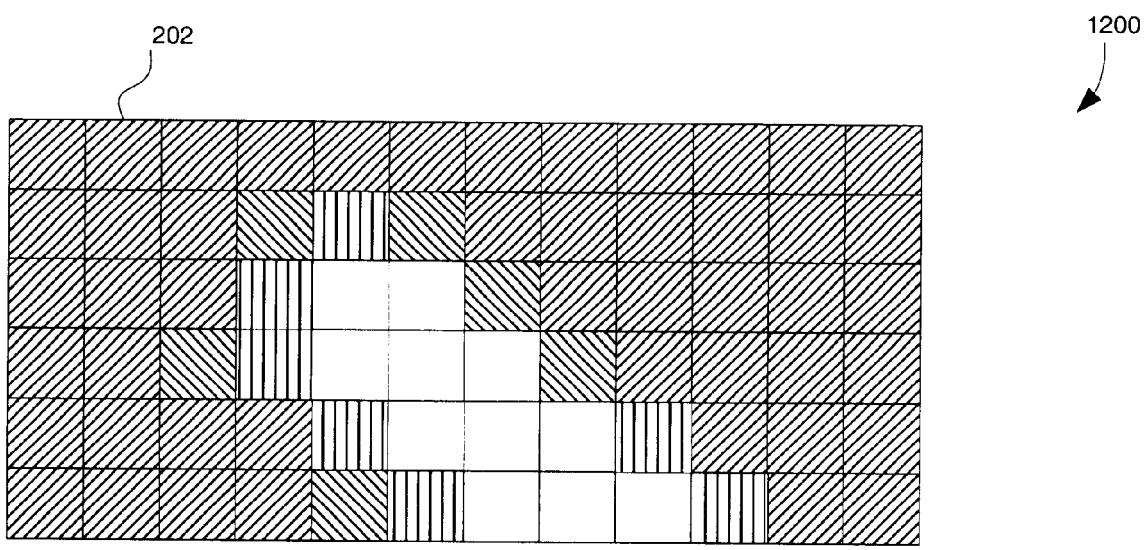
FIG. 12A is an image of a windowed foot, not drawn to scale. Also shown is a pixel grid is superimposed upon the foot of the lead.
Figure 12B:
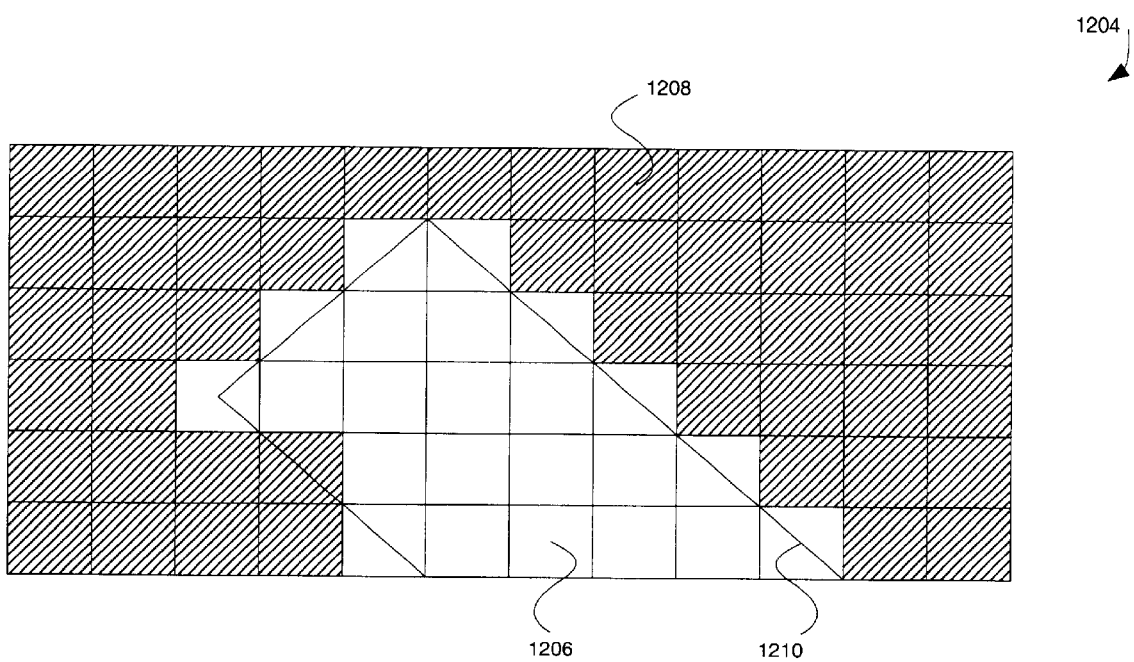
FIG. 12B is a binarized image of a foot of FIG. 12A using the threshold determined from the histogram of FIG. 12C. Also shown is part of a bounding box surrounding the foot.
Figure 12C:
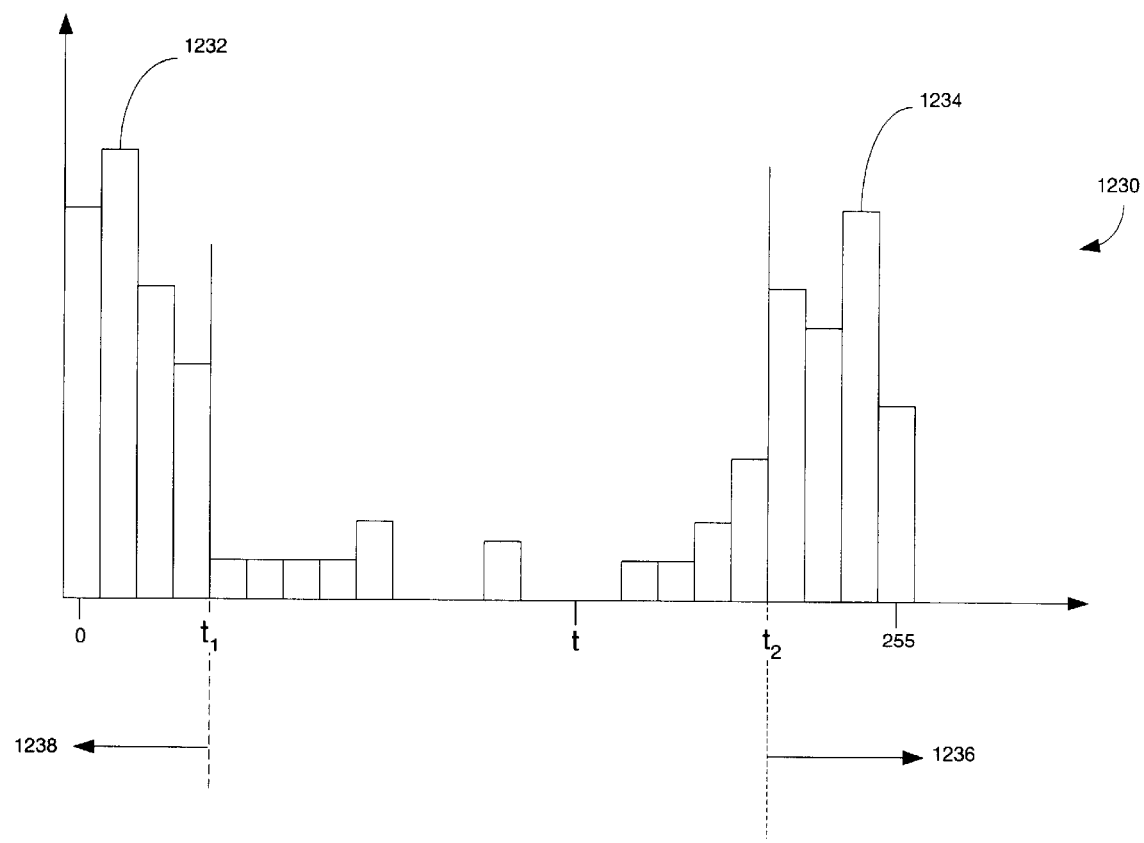
FIG. 12C is a histogram of an image of a foot of FIG. 12A.
Figure 12D:
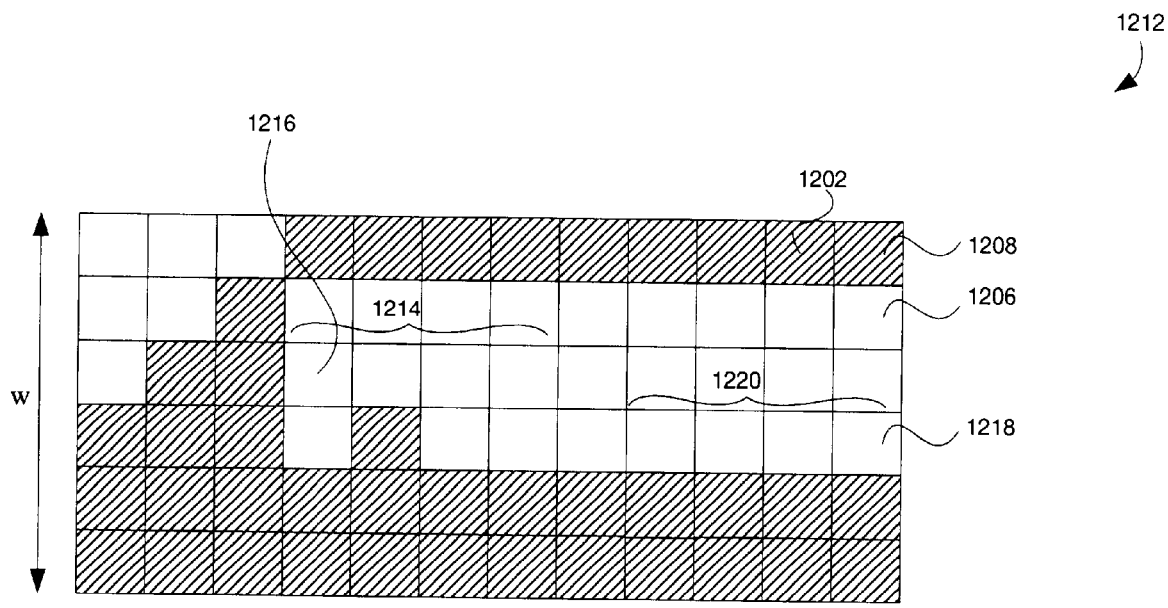
FIG. 12D is an affined-transformed image of the foot. Also shown is a pixel grid is superimposed upon the foot of the lead.

Optionally, before taking any steps to measure the foot, the foot is windowed (1100) to save processing time, where the window is positioned using the known variables or input from an operator. Thereafter, only the image within the window is evaluated for each foot, the windowed foot is shown in FIG. 12A.

More particularly, as shown in FIGS. 12A–12D, using a threshold the foot is segmented from the background and the remainder of the lead. The resulting binary image 1204 has foot 1206 as the foreground against the remainder of the image 1208, which includes both the remainders of the lead and the background. The threshold is found through the use of a histogram 1230 of the image containing the foot or the image within the optional window 1200.

A histogram is a graphic representation of pixels in the image. The histogram 1230 is a frequency representation of the brightness of pixels in the image 1200. The brightness of each of the pixels is the grey value of the pixel. Dark areas correspond to grey values closer to 0, while bright areas correspond to higher grey values, typically up to 255 for an 8-bit representation of brightness. Grey values are graphed on the abscissa against the number of pixels in the image sharing that grey value, which is graphed on the ordinate.

The histogram 1230 shows two groupings of pixels. The peak 1234 represents the most common grey value in the foot, the bright object in the image 1200, while the peak 1232 represents the most common grey value in the background.

A threshold, t, is chosen between the peaks 1232 and 1234. Normally, there is no threshold that can segment the entire lead from the rest of the image. Therefore, the method of the invention segments the foot from the rest of the image. In one embodiment, the threshold is determined using the method described in commonly assigned, co-pending U.S. patent application, Ser. No. 08/735,628 entitled "Model-based Adaptive Segmentation".

In a preferred embodiment, the threshold is chosen as a value between an estimated minimum percentage of pixels the foot will occupy and the maximum percentage of pixels the foot will occupy. The minimum percentage of pixels the foot can occupy is designated a%, and is the product of a fraction less than one times the area of the foot divided by the area of the window, that is $$a\% = \frac{(\text{fraction}) \times (\text{area of foot})}{\text{area of window}},$$

or more specifically $$a\% = \frac{(\text{fraction}) \times (\text{foot length}) \times (\text{lead width})}{(\text{window width}) \times (\text{window length})}$$

where window length and width are known, the foot length is an estimate typically input by a user, and the lead width is the previously measured lead width. The fraction ensures that the minimum area of the foot is not too high of an estimate. The fraction can be any value less than or equal to 1 and will vary for each object.

The maximum percentage of pixels the foot can occupy is designated b %, where b % is the product of a fraction greater than one times the area of the foot divided by the area of the window, that is $$b\% = \frac{(\text{fraction}) \times (\text{area of foot})}{\text{area of window}},$$

or more specifically $$b\% = \frac{(\text{fraction}) \times (\text{foot lenght}) \times (\text{lead width})}{(\text{window width}) \times (\text{window length})}$$

The fraction ensures that the maximum area of the foot is not too low of an estimate. The fraction can be any value greater than or equal to one and typically less than or equal to two.

The number of pixels equivalent to the minimum percentage of pixels the foot can occupy, a %, is subtracted from the total number of pixels in the histogram to produce $t_2$. Assuming the foot is bright, the number of pixels in the histogram 1230 to the right of $t_2$, i.e. area 1236, is less then the number of pixels in the foot. Therefore, area 1236 represents only pixels in the foot.

The number of pixels equivalent to the maximum percentage of pixels the foot can occupy, b %, is subtracted from the total number of pixels in the histogram to produce $t_1$. The pixels in the histogram 1230 to the left of $t_1$, i.e., area 1238, only represent pixels from areas other than the foot. The region from which the threshold t is chosen is now less than the area between the two peaks, making the proper choice of t more likely.

The threshold t is chosen as a value between $t_1$ and $t_2$ approximately in the middle, but closer to the bright threshold $t_2$ to minimize the effect of "blooming" of the foot under bright front light.

Using the threshold, the image 1200 is processed into the binary image 1204. Specifically, the grey value of each pixel of the image is compared against the threshold t. If the grey value of the pixel is greater than the threshold, the pixel is considered an object pixel and the grey value of that pixel is reassigned a high value, such as 255. Otherwise the pixels are considered background pixels, part of the lead or other background, but not the foot, and their grey values are reassigned a low value, such as 0. Consequently, all the pixels in the binarized image 1204 have one of two grey values, which label each pixel as part of the foot 1206 or part of the background 1208.

To determine the area of the foot, a pixel grid 1202 is superimposed upon the foot of the lead as shown in part of the image 1200 of FIG. 12A. In many cases, the exact edge of the foot does not fall precisely at the boundary between pixels on this grid. The pixels on the edge of the foot are counted as either part of the foot or part of the background. Consequently, the area of the foot can be under represented, too many pixels were considered part of the background, or over represented, too many pixels were considered part of the foot. This error is referred to as a spatial quantization error.

Optionally, to remove this effect an affine transformation of the image within the window is performed (1110), where an affine transformation is a procedure well known in the art, and an enhanced affine transformation method and apparatus are disclosed in co-pending, commonly assigned U.S. Patent Application entitled, "Image Processing Methods and Apparatus for Separable, General Affine Transformation of an Image", application Ser. No: 09/027,432, filed Feb. 20, 1998, incorporated herein by reference. The resulting image 1212 illustrated in FIG. 12C contain pixels with a weight of 1 or zero, i.e. the edge of the foot falls at the boundary between the pixels on the grid 1202.

The extents of the foot are found by searching the binarized, affine-transformed image 1212 for object pixels (i.e., foot pixels) at the boundaries that are part of a group of consecutive object pixels. The requirement that the pixel be part of a group of consecutive object pixels minimizes the likelihood of choosing pixels that represent noise, because it is unlikely for noise to effect a larger grouping of pixels. Preferably, the consecutive pixels extend along the length of the foot, such as group 1220. For example, using m=4, the foot 1206 is search across the width, w, for groups of four consecutive pixels along the length of the foot. The search ceases after a group of consecutive pixels are identified at each end 1214 and 1220. Once the pixel groups 1214 and 1220 are identified, the left-most pixel 1216 in the left group 1214, and the right-most pixel 1218 in the right group 1220, are identified as extents of the foot (1140).

Alternatively, the spatial quantization is compensated for by the BLOB TOOL, a software tool sold by Cognex Corporation, where the BLOB TOOL also gauges the extents of the foot. The foot is input to the BLOB TOOL as the object of interest. If necessary to minimize spatial quantization error, the BLOB TOOL smoothes the image of the foot 1204 by giving pixels on the border of the foot that do not correspond to the pixel grid an intermediate weight, a value between 0 and 1. Thereafter, the BLOB TOOL creates a second image 1204 containing only the object of interest (e.g., the foot 1206) and returns, if prompted, the extents of a bounding box 1210. The bounding box 1210 surrounds the foot 1206 and does not have to be aligned with a pixel grid. The extents of the bounding box 1210 correspond to the extents of the foot 1206. The BLOB TOOL is more fully described in Vision Tools, Chapter 5, Inspection, Revision 7.4, 1996 pp. 245–266, incorporated herein by reference. The BLOB TOOL has the advantage over the alternative in that the BLOB TOOL will minimize the effect of noise, because an object the size of noise is discounted as not part of the foot.

The center point of the foot (i.e., the point that is registered to the PCB) provides the last dimension necessary in the preferred application. The refined description can then be synthesized (214). Empirically, a rough GD 20% different in at least one dimension for a leaded object is easily refined by the method of the invention. The percentage difference achievable will vary for each object and application and the mentioning of 20% is in no way meant to limit the invention.

In one embodiment, the method is applied iteratively, such that the first refined GD and pose becomes the rough GD and pose and the process is repeated.

Returning to FIG. 2, once all remaining dimensions are measured (210), optionally the values for those measurements are validated (212). Checking whether the measurements are feasible validates the values. For instance, the foot length must always be less than or equal to the lead length.

Validation is particularly useful when an operator requests refinement of only a portion of the measurements. Optionally, the operator can request not to refine a known dimension. In such a case, the refined measurements can fail to coincide with the known dimension. Therefore, the known measurements are used to bound the range of other measured dimensions. For instance, if the value for the foot length is known, then the known value is a lower bound for the lead length. Similarly, if the value of the lead length is known, then the known value is an upper bound for the foot length. Also, if the value for the lead width is known, than one-half the known dimension is an upper bound on the lead pitch.

The pose can also aid in validation. Specifically, the refined pose can optionally be used to display the refined GD superimposed over the image of the object (216). As the GD is easily intuitively verifiable, particular when it is superimposed upon the image of the object, this is another way to verify the accuracy of the refined GD.

Additionally, the refined pose is optionally used to generate a complete description of a leaded object by combining at the orientation given by the refined pose the refined GDs of more than one lead sets of a single leaded object. Then, the refined GD of the entire leaded object can be validated and/or viewed.

The refined pose is also useful in applications that operate on the object from its position in the image, such as inspection of mounted objects, for example.

The refined pose is a useful, but not a necessary output of the invention.

Although the preferred implementation uses the CALIPER TOOL, it should be apparent that projecting an area within a two-dimensional window into a one-dimensional signal, i.e., summing the pixel intensities of an area, without further processing will provide enough information to find the changes in intensity. Further, applying an edge operator, such as Sobel, across a portion of the image will also provide the required information. Even a one-dimensional scan may provide the required information.

Although the rough pose in FIGS. 1A and 1B was defined relative to the same origin as angles of windows 702, $\theta_1$, $\theta_2$, and $\theta_r$, it should be apparent that the rough pose can also be defined relative to another origin, such as the upper-right hand corner, for instance. In such a circumstance, the angle of windows 702, $\theta_1$, $\theta_2$, and $\theta_r$ would be offset by the angular displacement of the origin, such as −90° measured relative to an origin in the upper-right hand corner.

Further, although the window is positioned such that its projections axis, pa, is as close as possible to substantially parallel or substantially normal to the length of the objects, the degree pa can be offset from parallel or normal depends upon each application and varies widely as is known in the art.

Other modifications and implementations will occur to those skilled in the art without departing from the spirit and the scope of the invention as claimed. Accordingly, the above description is not intended to limit the invention except as indicated in the following claims.

What is claimed is:

1. A method for refining a rough geometric description and a rough pose of an object having a plurality of extensions so as to provide a refined geometric description and a refined pose, the method comprising:
   acquiring an image of the object;
   locating at least two anchor points in the image related to at least two of the plurality of extensions;
   aligning in a least one dimension the rough geometric description relative to the object in the image using the at least two anchor points to provide a partially aligned rough geometric description;
   measuring dimensions of the object in the image using the partially aligned rough geometric description to provide measured dimensions; and
   updating the rough geometric description to substantially match the measured dimensions of the object, thereby generating a refined geometric description and a refined pose of at least a portion of the object.

2. The method of claim 1, wherein the plurality of extensions are contacts and the object is an electronic component.

3. The method of claim 1, wherein the anchor points comprise points of high contrast on substantially all the plurality of extensions.

4. The method of claim 1, wherein the anchor points comprises centroids of bright regions on substantially all the plurality of extensions.

5. The method of claim 1, wherein the rough geometric description and the rough pose are provided by electronically reading a drawing.

6. The method of claim 1, wherein locating at least two anchor points in the image related to at least two of the plurality of extensions comprises,
   locating at least two points of high contrast to provide rough anchor points by projecting pixels within a locating window having a projection axis positioned substantially at an angle of the rough pose and covering at least a portion of two of the plurality of extensions;
   fitting a curve to the at least two points; and
   locating a point of highest contrast for each of the plurality of extensions being the at least two anchor points by projecting pixels within a locating window for each of the extensions having a projection axis positioned substantially at an angle of the curve.

7. The method of claim 6, wherein the locating window is a window of the CALIPER TOOL.

8. The method of claim 1, wherein locating at least two anchor points in the image related to at least two of the plurality of extensions comprises,
   locating at least two centroids of a region of brightness to provide rough anchor points by examining pixels within a locating window having at least one side positioned substantially at an angle of the rough pose and covering at least a portion of two of the plurality of extensions;
   fitting a curve to the at least two centroids; and
   locating a centroid for each of the plurality of extensions being the at least two anchor points by examining pixels within a locating window for each of the extensions having at least one side positioned substantially at an angle of the curve.

9. The method of claim 1, wherein aligning in at least one dimension the rough geometric description relative to the object in the image using the at least two anchor points to provide a partially aligned rough geometric description involves, calculating a refined dimension of the rough pose using the at least two anchor points; and
   aligning the rough geometric description according to the refined dimension relative to the object in the image to provide a partially aligned rough geometric description.

10. The method of claim 9, wherein calculating a refined dimension of the rough pose using the at least two anchor points involves, calculating an angle of a curve substantially fitting the at least two anchor points,
   where the angle of the curve is the refined dimension.

11. The method of claim 1, wherein measuring dimensions of the object in the image using the partially aligned rough geometric description to provide measured dimensions includes,
   measuring dimensions of the plurality of extensions.

12. The method of claim 11, wherein updating the rough geometric description to substantially match the measured dimensions of the object, thereby generating a refined geometric description of at least a portion of the object involves,
   updating the rough geometric description and rough pose to substantially match the measured dimensions of the object and the plurality of extensions, thereby generating a refined geometric description and refined pose of at least a portion of the object and the plurality of extensions.

13. The method of claim 1, wherein measuring dimensions of the object in the image using the partially aligned rough geometric description to provide measured dimensions involves,
   locating an end of substantially each of the extensions by projecting pixels within a window superimposed over the image oriented with a projection axis aligned with the aligned rough geometric description;
   using positions of the ends of substantially each of the extensions in the image and the rough geometric description to measure other dimensions of the object in the image.

14. The method of claim 1, wherein measuring dimensions of the object in the image using the partially aligned rough geometric description to provide measured dimensions involves,
   locating sides of substantially each of the extensions by projecting pixels within a window superimposed over the image oriented with a projection axis aligned with the aligned rough geometric description;

using positions of the sides of substantially each of the extensions in the image and the rough geometric description to measure other dimensions of the object in the image.

15. The method of claim 1, wherein measuring dimensions of the object in the image using the partially aligned rough geometric description to provide measured dimensions includes, calculating a histogram of at least one region of the object within a window superimposed over the image oriented with at least one side aligned with the aligned rough geometric description, the histogram having a plurality of brightnesses;

identifying a potential threshold region between two opposed outlying regions of the histogram by identifying the two opposed outlying regions using expected areas of the each of the two outlying opposed brightness regions, a portion of the expected areas being the rough geometric description;

identifying a threshold within the potential threshold region to segment the region of the object;

thresholding the image containing the region to generate an object image containing the region of the object to measure; and measuring the extent of the region within the object image.

16. The method of claim 15, wherein the region is a foot of a lead.

17. The method of claim 1, wherein measuring dimensions of the object in the image using the partially aligned rough geometric description to provide measured dimensions involves, measuring least unknown dimensions before measuring more unknown dimensions.

18. The method of claim 1, further comprising, displaying the refined geometric description graphically.

19. The method of claim 1, further comprising, displaying the refined pose graphically.

20. The method of claim 1, further comprising, validating the refined geometric description against predetermined values.

21. The method of claim 1, wherein the rough geometric description is approximately 20 percent different in at least one dimension than a geometric description of the object.

22. A method for refining a rough geometric description of an object having a plurality of extensions, the method comprising:

acquiring an image of the object;

locating at least two anchor points in the image related to at least two of the plurality of extensions;

aligning in at least one dimension the rough geometric description relative to the object in the image using the at least two anchor points to provide a partially aligned rough geometric description;

measuring dimensions of the object using the partially aligned rough geometric description to provide measured dimensions; and updating the rough geometric description to substantially coincide with the measured dimensions of the object, thereby generating a refined geometric description of at least a portion of the object.

23. The method of claim 22, wherein acquiring an image of the object includes acquiring a rough pose of the object, and wherein updating the rough geometric description to substantially coincide with the measured dimensions of the object, includes updating the rough geometric description and the rough pose to substantially coincide with the measured dimensions of the object, thereby generating a refined geometric description and a refined pose of at least a portion of the object.

24. The method of claim 23, wherein locating at least two anchor points in the image related to at least two of the plurality of extensions comprises, locating at least two points of high contrast to provide rough anchor points by projecting pixels within a locating window having a projection axis positioned substantially at an angle of the rough pose and covering at least a portion of two of the plurality of extensions;

fitting a curve to the at least two points; and locating a point of highest contrast for each of the plurality of extensions being the at least two anchor points by projecting pixels within a locating window for each of the extensions having a projection axis positioned substantially at an angle of the curve.

25. The method of claim 23, wherein locating at least two anchor points in the image related to at least two of the plurality of extensions comprises, locating at least two centroids of a region of brightness to provide rough anchor points by examining pixels within a locating window having at least one side positioned substantially at an angle of the rough pose and covering at least a portion of two of the plurality of extensions;

fitting a curve to the at least two centroids; and locating a centroid for each of the plurality of extensions being the at least two anchor points by examining pixels within a locating window for each of the extensions having at least one side positioned substantially at an angle of the curve.

26. The method of claim 23, wherein aligning in at least one dimension the rough geometric description relative to the object in the image using the at least two anchor points to provide a partially aligned rough geometric description involves, calculating a refined dimension of the rough pose using the at least two anchor points; and aligning the rough geometric description according to the refined dimension relative to the object in the image to provide a partially aligned rough geometric description.

27. The method of claim 26, wherein calculating a refined dimension of the rough pose using the at least two anchor points involves, calculating an angle of a curve substantially fitting the at least two anchor points, where the angle of the curve is the refined dimension.

28. The method of claim 27, wherein measuring dimensions of the object in the image using the partially aligned rough geometric description to provide measured dimensions includes, measuring dimensions of the plurality of extensions.

29. The method of claim 22, wherein measuring dimensions of the object in the image using the partially aligned rough geometric description to provide measured dimensions includes, calculating a histogram of at least one region of the object within a window superimposed over the image oriented with at least one side aligned with the aligned rough geometric description, the histogram having a plurality of brightnesses;

identifying a potential threshold region between two opposed outlying regions of the histogram by identifying the two opposed outlying regions using expected areas of the each of the two outlying opposed brightness regions, a portion of the expected areas being the rough geometric description;

identifying a threshold within the potential threshold region to segment the region of the object;

thresholding the image containing the region to generate an object image containing the region of the object to measure; and measuring the extent of the region within the object image.

30. The method of claim 22, further comprising, validating the refined geometric description against predetermined values.

31. An apparatus for refining a rough geometric description of an object having a plurality of extensions, the apparatus comprising:

an image of the object;

at least two anchor points in the image related to at least two of the plurality of extensions;

means for aligning in at least one dimension the rough geometric description relative to the object in the image using the at least two anchor points to provide a partially aligned rough geometric description;

means for measuring dimensions of the object using the partially aligned rough geometric description to provide measured dimensions; and means for updating the rough geometric description to substantially coincide with the measured dimensions of the object, thereby generating a refined geometric description of at least a portion of the object.

32. The apparatus of claim 31, further comprises:

means for locating at least two points of high contrast to provide rough anchor points by projecting pixels within a locating window having a projection axis positioned substantially at an angle of the rough pose and covering at least a portion of two of the plurality of extensions;

means for fitting a curve to the at least two points; and means for locating a point of highest contrast for each of the plurality of extensions being the at least two anchor points by projecting pixels within a locating window for each of the extensions having a projection axis positioned substantially at an angle of the curve.

33. The apparatus of claim 31, further comprises:

means for locating at least two centroids of a region of brightness to provide rough anchor points by examining pixels within a locating window having at least one side positioned substantially at an angle of the rough pose and covering at least a portion of two of the plurality of extensions;

means for fitting a curve to the at least two centroids; and means for locating a centroid for each of the plurality of extensions being the at least two anchor points by examining pixels within a locating window for each of the extensions having at least one side positioned substantially at an angle of the curve.

34. The apparatus of claim 31, wherein means for aligning in at least one dimension the rough geometric description relative to the object in the image using the at least two anchor points to provide a partially aligned rough geometric description involves, means for calculating a refined dimension of the rough pose using the at least two anchor points; and means for aligning the rough geometric description according to the refined dimension relative to the object in the image to provide a partially aligned rough geometric description.

35. The apparatus of claim 31, wherein means for calculating a refined dimension of the rough pose using the at least two anchor points involves, means for calculating an angle of a curve substantially fitting the at least two anchor points, where the angle of the curve is the refined dimension.

36. The apparatus of claim 31, wherein means for measuring dimensions of the object in the image using the partially aligned rough geometric description to provide measured dimensions includes, means for measuring dimensions of the plurality of extensions.

37. The apparatus of claim 31, wherein the means for measuring dimensions of the object in the image using the partially aligned rough geometric description to provide measured dimensions includes, means for calculating a histogram of at least one region of the object within a window superimposed over the image oriented with at least one side aligned with the aligned rough geometric description, the histogram having a plurality of brightnesses;

means for identifying a potential threshold region between two opposed outlying regions of the histogram by identifying the two opposed outlying regions using expected areas of the each of the two outlying opposed brightness regions, a portion of the expected areas being the rough geometric description;

means for identifying a threshold within the potential threshold region to segment the region of the object;

means for thresholding the image containing the region to generate an object image containing the region of the object to measure; and means for measuring the extent of the region within the object image.

38. The apparatus of claim 31, further comprising, validating the refined geometric description against predetermined values.

* * * * *